United States Patent
Melchy et al.

(10) Patent No.: US 12,444,224 B2
(45) Date of Patent: Oct. 14, 2025

(54) MACHINE LEARNING FOR DATA EXTRACTION

(71) Applicant: Jumio Corporation, Palo Alto, CA (US)

(72) Inventors: Pierre-Éric Michaël Alix Melchy, Montreal (CA); Labhesh Patel, Palo Alto, CA (US); Philipp Pointner, Vienna (AT); Radu Rogojanu, Vienna (AT); Antoine Bon, Vienna (AT)

(73) Assignee: Jumio Corporation, Sunnyvale, CA (US)

( * ) Notice: Subject to any disclaimer, the term of this patent is extended or adjusted under 35 U.S.C. 154(b) by 403 days.

(21) Appl. No.: 17/841,571

(22) Filed: Jun. 15, 2022

(65) Prior Publication Data

US 2022/0309813 A1     Sep. 29, 2022

Related U.S. Application Data

(63) Continuation of application No. PCT/US2019/067747, filed on Dec. 20, 2019.

(51) Int. Cl.
*G06V 30/413* (2022.01)
*G06V 10/82* (2022.01)
*G06V 30/18* (2022.01)

(52) U.S. Cl.
CPC ............ *G06V 30/413* (2022.01); *G06V 10/82* (2022.01); *G06V 30/18057* (2022.01)

(58) Field of Classification Search
None
See application file for complete search history.

(56) References Cited

U.S. PATENT DOCUMENTS

| | | | | |
|---|---|---|---|---|
| 10,467,464 | B2* | 11/2019 | Chen | G06V 30/412 |
| 10,860,785 | B2* | 12/2020 | Miyamoto | H04N 1/00331 |
| 11,087,123 | B2* | 8/2021 | Chitta | G06V 10/82 |
| 11,853,406 | B2* | 12/2023 | Benkreira | G06V 40/40 |
| 12,019,675 | B2* | 6/2024 | Tripuraneni | G06F 16/5846 |
| 2017/0351913 | A1* | 12/2017 | Chen | G06V 30/412 |
| 2019/0370688 | A1* | 12/2019 | Patel | H04L 9/3231 |
| 2021/0200937 | A1* | 7/2021 | Wheaton | G06F 40/284 |

(Continued)

FOREIGN PATENT DOCUMENTS

CN     110222695 A     9/2019

OTHER PUBLICATIONS

Jumio Corporation, Communication Pursuant to Article 94(3), EP19842953.2, Apr. 25, 2024, 5 pgs.

(Continued)

*Primary Examiner* — Anand P Bhatnagar
(74) *Attorney, Agent, or Firm* — Patent Law Works LLP

(57) ABSTRACT

Computer systems and methods are provided for extracting information from an image of a document. A computer system receives image data, the image data including an image of a document. The computer system determines a portion of the received image data that corresponds to a predefined document field. The computer system utilizes a neural network system to assign a label to the determined portion of the received image data. The computer system performs text recognition on the portion of the received image data and stores the recognized text in association with the assigned label.

24 Claims, 15 Drawing Sheets

(56) References Cited

U.S. PATENT DOCUMENTS

2023/0206619 A1* 6/2023 Lund ................ G06V 30/18057
                                                        382/157
2024/0126855 A1* 4/2024 Benkreira ............ G06V 30/413
2024/0135700 A1* 4/2024 Flament ........... G06V 30/18057
2024/0346069 A1* 10/2024 Tripuraneni ........... G06V 10/44

OTHER PUBLICATIONS

Jumio Corporation, International Search Report and Writen Opinion, PCT/US2019/067747, Sep. 7, 2020, 11 pgs.
Jumio Corporation, International Preliminary Report on Patentability, PCT/US2019/067747, May 17, 2022, 8 pgs.

* cited by examiner

800

Mapped Fields 902

DOB | 08/27/2020  Country | US  Hair | BLK
Class | CM1
Doc. Type | OFFICIAL IDENTIFICATION
Eyes| BLK   SEX | M
Doc. Number | 12345678   SEX | M
Address |123 Address St. City, State, 12345
Name | Carl M. Bradbury Jr

804

| | |
|---|---|
| Document type | Official Identification |
| Country | US |
| Document Number | 12345678 |
| Name | Carl M. Bradbury Jr |
| Date of Birth | 08/27/2020 |
| Address | 123 Address St. City, State, 12345 |
| Sex | M |
| Class | CM1 |
| Hair | BLK |
| Eyes | BLK |

806

| | |
|---|---|
| Document type | Official Identification |
| Country | United States |
| Document Number | 12345678 |
| First Name | Carl |
| Middle Name | M. |
| Last Name | Bradbury |
| Suffix | Jr |
| Date of Birth | August 27, 2020 |
| Street Address | 123 Address St. |
| City | City |
| State | State |
| Zip Code | 12345 |
| Sex | Male |
| Hair | Black |
| Class | Car/Motorcycle |
| Eye Color | Black |

```
912 (cont.)
Determine a portion of the received image data that corresponds to a predefined
document field
```

- 916a
  Determine a saliency value for the predefined document field
- 916b
  determining whether the saliency value for the predefined document field meets a predetermined saliency threshold, and
- 916c
  in accordance with a determination that the saliency value does not meet the predetermined saliency threshold, requesting new image data that includes an image of the document

- 918a
  In accordance with a determination that the saliency value meets the predetermined saliency threshold, generates a bounding box for the predefined document field and
- 918b
  performing text recognition on the generated bounding box.

- 920a
  Determine a position of the image of the document,
- 920b
  Determine whether the position of the document meets orientation criteria, and
- 920c
  in accordance with a determination that the position of the document meets orientation criteria, utilize a neural network system to assign a label to the determined portion of the received image data.

- 922
  Determine the position of the image of the document includes identifying respective corners of the image of the document and comparing the respective corners of the image of the document with document characteristics corresponding to a document type to determine the position of the document

920 (cont.)
Determine a position of the image of the document

924a
The image of the document includes facial image data; and
924b
Determine the position for the image of the document includes determining one or more facial features corresponding to the facial image data and
924c
Determine the position of the image of the document of the image data based on the one or more facial features.

926a
The predefined document field includes text and
926b
Determining the position for the image of the document includes: determining, based on the predefined field, a text position and determining the position of the image of the document based on the text position

928
Determine that the position of the image of the document includes cropping the portion of the received image data

930a
In accordance with a determination that the position of the image of the document does not meet the orientation criteria, adjust the image of the document to satisfy the orientation criteria, and
930b
in accordance with a determination that the position corresponding to the adjusted image of the document meets the orientation criteria, perform text recognition on the adjusted image of the document

932 (cont.)
Utilize a neural network system to assign a label to the determined portion of the received image data

942a
The neural network system includes a plurality of systems, the plurality of systems includes both the RNN and the CNN and determining the label for the generated bounding box includes:

942b
Determining, using a first system of the plurality of systems, a first label for the generated bounding box

942c
Determining, using a second system of the plurality of systems, a second label for the generated bounding box

942d
Comparing the first label and the second label to determine whether the first label and the second label match, and

942e
In accordance with a determination that the first label and the second label match, assigning the first label or the second label to the generated box

944
In accordance with a determination that the first label and the second label do not match, assign a respective label of the first label or the second label with a highest relevance score that at least meets a relevance threshold

946
The respective labels include at least one of first name, last name, middle name, address, dates, or document number

930 (cont.)
Utilize a neural network system to assign a label to the determined portion of the received image data

948a
The neural network system includes a registration system, the registration system including a first template, wherein the first template includes a first predetermined label, the first predetermined label associated with a first predetermined label location and determining the label for the generated bounding box includes:

948b
Determine whether the first predetermined label corresponds to the generated bounding box by superimposing the first template over the image of the document

948c
Compare the predetermined label location with the generated bounding box to determine a template value

948d
Determine whether the template value meets similarity threshold and

948e
in accordance with a determination that the template value meets the similarity threshold, determine a relevant label based on the first predetermined label

950a
The registration system includes a second template, the second template including a second predetermined label, the second predetermined label associated with a second predetermined label location and

950b
in accordance with a determination that the template value for the first template does not meet the similarity threshold, determining the label for the generated bounding box based on the second template

952
Determine the template value includes determining respective distances between the first predetermined label location and one or more edges of the image of the document, the respective distances measured based on one or more pixels between the first predetermined label location and the one or more edges

Figure 9F

MACHINE LEARNING FOR DATA EXTRACTION

This application is a continuation of International App. No. PCT/US19/67747, filed Dec. 20, 2019, which is hereby incorporated by reference in its entirety.

TECHNICAL FIELD

This application relates generally to extraction of information, and more particularly, to using a neural network system to identify and extract portions of information that correspond to captured data.

BACKGROUND

Captured images include information that needs to be extracted and stored for future use. A number of different techniques are used to process captured images to extract information. Several of the techniques commonly used to extract information from captured images rely on inflexible operations and/or rigid formats of captured images to effectively extract and store information from the captured images.

SUMMARY

Accordingly, there is a need for systems and/or devices that perform machine learning on captured data to extract information. Such systems, devices, and methods optionally complement or replace conventional systems, devices, and methods for extracting information from captured data.

The disclosed subject matter includes, in one aspect, a computerized method for receiving image data that includes an image of a document. The method determines a portion of the received image data that corresponds to a predefined document field. The method utilizes a neural network system to assign a label to the determined portion of the received image data. The method performs text recognition on the portion of the received image data. Further, the method stores recognized text in association with the assigned label.

In accordance with some embodiments, a non-transitory computer readable storage medium stores one or more programs. The one or more programs comprise instructions, which when executed, cause a device to receive image data that includes an image of a document. The instructions also cause the device to determine a portion of the received image data that corresponds to a predefined document field. The instructions also cause the device to utilize a neural network system to assign a label to the determined portion of the received image data. The instructions cause the device to perform text recognition on the portion of the received image data. Further, the instructions also cause the device to store recognized text in association with the assigned label.

In accordance with some embodiments, a system comprises one or more processors, memory, and one or more programs. The one or more programs are stored in the memory and are configured for execution by the one or more processors. The one or more programs include instructions for receiving image data that includes an image of a document. The one or more programs also include instructions for determining a portion of the received image data that corresponds to a predefined document field. The one or more programs also include instructions for utilizing a neural network system to assign a label to the determined portion of the received image data. The one or more programs include instructions for performing text recognition on the portion of the received image data. Further, the one or more programs also include instructions for storing recognized text in association with the assigned label.

BRIEF DESCRIPTION OF THE DRAWINGS

So that the present disclosure can be understood in greater detail, features of various embodiments are illustrated in the appended drawings. The appended drawings, however, merely illustrate pertinent features of the present disclosure and are therefore not limiting.

FIG. 8 illustrates extraction and sanitization of information in a document, in accordance with some embodiments.

FIGS. 9A-9G are flow diagrams that illustrate a method of extracting and sanitizing information in a document, in accordance with some embodiments.

In accordance with common practice, some of the drawings may not depict all of the components of a given system, method, or device. Finally, like reference numerals denote like features throughout the specification and figures.

DETAILED DESCRIPTION

Figure 1:
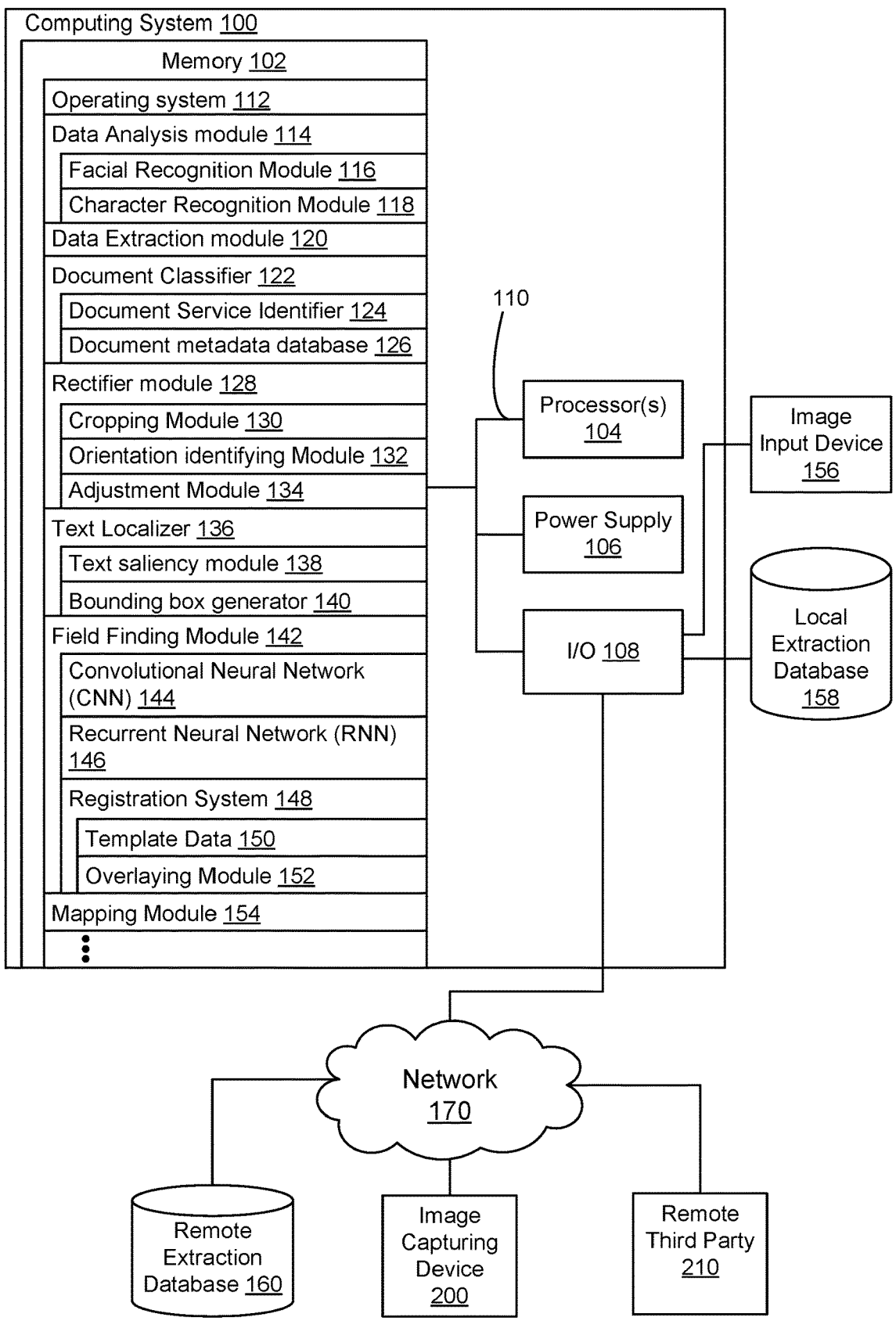
FIG. 1 is a system diagram of a computing system and its context, in accordance with some embodiments.

The systems and methods described herein pertain to machine learning processing for identifying and extracting information that corresponds to captured data.

The systems and methods are used for identifying information in a document and extracting the information with associated (e.g., mapped) labels. The systems and methods process a captured image of a document to improve the readability or saliency of the information in the document. Additionally and/or alternatively, the systems and methods process the captured image to perform a number of transformations, such as reorienting, cropping, and/or identifying the document and/or portions of the document within the captured image. The systems and methods use different systems (e.g., including a registration system and one or more neural network systems), either alone or in combination, to analyze and extract data. In some embodiments, a registration system uses one or more templates, values, and/or algorithms, transformations, and/or corrections on the captured image document and/or portions of the captured image document for analyzing and extracting data. The systems described herein are used to accurately locate, identify, and extract data from a captured image. The different systems are used either alone or in combination to improve, verify, and/or supplement the extraction of data. In this way, the systems and methods described herein improve the functionality, efficiency, and/or accuracy of data extraction from images of documents.

In some embodiments, captured images of documents are provided by a user or a remote third party for data extraction. The documents in the captured images may be any variety of types of documents that originate from a wide range of sources (e.g., official documents from a multitude of different countries). In some embodiments, the systems and methods described herein determine the type of document and/or the origin of the document. Alternatively and/or additionally, in some embodiments, the received images capture the document in odd angles, upside down, and/or other skewed positions. The systems and methods process the captured images such that the accuracy of data extraction is improved. In some embodiments, the systems and methods determine labels for the extracted data and and/or associate (e.g., map) the determined labels to the extracted data. Alternatively and/or additionally, in some embodiments, the systems and methods sanitize the extracted data such that a uniform format and/or uniform standard information is captured.

In some embodiments, the data extraction systems and methods described herein improve the accuracy of data extraction by transforming and/or processing a captured image such that the systems and methods determine appropriate labels for information of the captured document. The data extraction systems and methods further reduce the amount of human involvement, thus reducing the time required for a data extraction process. For example, by automatically transforming (e.g., rotating) an image of a document before performing data extraction, the systems and methods do not require a user to rigidly adhere to an image capture process (e.g., do not require a user to recapture an image of the document that is upside down). Further, by utilizing a uniform format and/or removing formatting specific to a document, some embodiments reduce the extent of human review needed for the extracted data (e.g., human reviewers are provided a standardized format that enables quick review of extracted information). Using the data extraction systems and methods described herein to reduce the amount of information that is provided between a user, a remote third party, and/or the data extraction system, while reducing the amount of storage required for each additional recapture, makes the processing of data extraction requests faster and more efficient, with less required human interaction, which in turn reduces the processing and power used by a data extraction system.

FIG. 1 is a system diagram of a data extraction server system 100 (also referred to herein as a "machine learning system"), in accordance with some embodiments. The data extraction server 100 typically includes a memory 102, one or more processor(s) 104, a power supply 106, an input/output (I/O) subsystem 108, and a communication bus 110 for interconnecting these components.

The processor(s) 104 execute modules, programs, and/or instructions stored in the memory 102 and thereby perform processing operations.

In some embodiments, the memory 102 stores one or more programs (e.g., sets of instructions) and/or data structures, collectively referred to herein as "modules." In some embodiments, the memory 102, or the non-transitory computer readable storage medium of the memory 102 stores the following programs, modules, and data structures, or a subset or superset thereof:

an operating system 112;

a document analysis module 114 for processing (e.g., analyzing) a document in a received image and determining characteristics of the document. The document analysis module 114 may include the following modules (or sets of instructions), or a subset or superset thereof:

a facial recognition module 116 for identifying and/or processing (e.g., analyzing and/or determining) facial image data in a document. The facial recognition module 116 performs facial recognition techniques on facial image data for analysis and comparisons. In some embodiments, facial recognition techniques include identifying facial features, face shape, face depth, face contour, etc.; analyzing the relative position, size, and/or shape of the eyes, nose, mouth, cheekbones, jaw, etc.; and/or using these features to search for other images with matching features; and a character recognition module 118 for identifying and/or processing (e.g., analyzing and/or determining) information and/or characteristics included in a document. In some embodiments, the character recognition module 118 determines portions of the document that include text. In some embodiments, the character recognition module 118 determines saliency and/or readability of the text within the portions of the document. In some embodiments, the character recognition module 118 identifies and/or determines text in the document using character recognition techniques such as optical character recognition (OCR), optical word recognition, intelligent character recognition (ICR), intelligent word recognition (IWR). In some embodiments, character recognition techniques include targeting typewritten text (e.g., one glyph, character, and/or word at a time) and/or targeting handwritten printscript and/or cursive text (e.g., one glyph, character, and/or word at a time);

a data extraction module 120 for processing (e.g., extracting) information of documents in captured image data. The data extraction module 120 extracts information from lines of text of the corresponding documents in the captured image data;

a document classifier 122 for determining a document classification for the captured data. The document classifier 122 determines the type of document such as a driver's license, passport, identification, etc. In some embodiments, the document classifier determines the layout of the captured image data such as landscape and/or portrait document configuration. The document classifier 122 may include the following modules (or sets of instructions), or a subset or superset thereof:

a document service identifier 124 for processing (e.g., analyzing) and determining document metadata corresponding to a document of an issuing party (e.g., government, private entity, etc.), originating region (e.g., country, state, city, etc.), etc.; and a document metadata database 126 for storing and accessing document specific metadata such as formats for names, addresses dates, document number, text, and images, as well as anchors and/or other document specific identifiers;

a rectifier module 128 for processing (e.g., analyzing) and transforming (e.g., adjusting) captured data. In some embodiments, the rectifier module 128 identifies one or more corners of a document within the captured image data. Additionally and/or alternatively, in some embodiments, the rectifier module 128 processes the identified document for data extraction. The rectifier module 128 may include the following modules (or sets of instructions), or a subset or superset thereof:

- a cropping module 130 for processing and/or determining a portion of the document. The determined portion of the document is cropped and utilized for data extraction;
- an orientation identifying module 132 for processing and/or determining the cropped portion of the document. An orientation of the document (e.g., landscape, portrait, or some skewed orientation) is determined by analyzing the determined portions of the document; and
- an adjustment module 134 for adjusting the determined orientation of the document. The document is adjusted such that extraction is performed on an predetermined orientation;

a text localizer module 136 for determining the location of text within the document and/or cropped portion of the document. In some embodiments, the text localizer module 136 determines one or more lines of text within the document. The text localizer module 136 may include the following modules (or sets of instructions), or a subset or superset thereof:

- a text saliency module 138 for determining the saliency and/or readability of the text within a document and/or the cropped portions of the document. In some embodiments, the text saliency module 138 processes and/or augments the text within the document and/or the cropped portion of the document to improve processing; and
- a bounding box generator 140 for generating a bounding box around the locations of identified text and/or particular information that is represented in multiple lines of text. In some embodiments, the generated bounding boxes enclose the determined text and/or one or more lines of text within the document and/or the cropped portions of the document;

a field finding module 142 (also referred to as a neural network system) for processing (e.g., analyzing) and determining labels for the text of the document, the cropped portions of the document, and/or the generated bounding boxes. The field finding module 142 utilizes one or more machine learning processes to determine the corresponding labels for the text of the document, the cropped portions of the document, and/or the generated bounding boxes. The field finding module 142 may include one or more neural networks and other systems for assigning labels. In particular field finding module 142 may include the following modules (or sets of instructions), or a subset or superset thereof:

- a convolutional neural network (CNN) module 144 for processing (e.g., analyzing) at least a portion of the document (e.g., the cropped portions of the document, and/or the portion of the document within generated bounding boxes) to determine labels for the at least portion of the document. The CNN module 144 analyzes the at least portion of the document via a deep learning system (e.g., deep learning methodology) for image recognition, images classification, objects detection, and/or facial recognition;
- a recurrent neural network (RNN) module 146 for processing (e.g., analyzing) the at least portion of the document to determine labels for the at least portion of the document. The RNN module 146 analyzes the at least portion of the document via another deep learning system (e.g., deep learning methodology) for image classification, image captioning, input classification, language translation, and/or video classification; and
- a registration module 148 for processing the at least portion of the document and determining corresponding labels for the at least portion of the document utilizing stored information corresponding to distinct document types. The registration module 148 may include the following modules (or sets of instructions), or a subset or superset thereof:
  - a template database 150 for storing and accessing templates corresponding to distinct document types. In some embodiments, the templates include predetermined labels corresponding to portions of the document type; and
  - an overlaying module 152 for processing (e.g., superimposing and/or overlaying) the determined template over the at least portion of the document and determining corresponding labels. The determination of the corresponding labels is based on the superimposed predetermined labels over the document, the cropped portions of the document, and/or the generated bounding boxes. In some embodiments, superimposing and/or overlaying the determined template includes aligning the template over the at least portion of the document. Additionally and/or alternatively, in some embodiments, overlaying module 152 determines a distance between the text of the document and/or the generated bounding box and the edge of the document to determine a template; and
- a mapping module 154 for processing (e.g., mapping and/or associating) determined labels to the at least portion of the document.

The above identified modules (e.g., data structures and/or programs including sets of instructions) need not be implemented as separate software programs, procedures, or modules, and thus various subsets of these modules may be combined or otherwise re-arranged in various embodiments. In some embodiments, the memory 102 stores a subset of the modules identified above. In some embodiments, a remote (e.g., third-party) extraction database 160 and/or a local extraction database 158 stores a portion or all of one or more modules identified above. Furthermore, the memory 102 may store additional modules not described above. In some embodiments, the modules stored in the memory 102, or a non-transitory computer readable storage medium of the memory 102, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 104. In some embodiments, one or more modules (e.g., rectifier module 128) are stored on, executed by, and/or is distributed across one or more of multiple devices (e.g., data extraction server system 100, remote third party 210, and/or image capturing device 200).

In some embodiments, the I/O subsystem 108 communicatively couples the server system 100 to one or more devices, such as an image input device 156 (e.g., a camera, scanner, and/or video capturing device coupled to the data extraction server system 100), a local extraction database 158, a remote (e.g., third-party) extraction database 160, a remote third party system 210 (e.g., merchant system that receives and/or captures information corresponding to a user), and/or an image capturing device 200 (e.g., a user device and/or kiosk) via a communications network 170 and/or via a wired and/or wireless connection. In some embodiments, the communications network 170 is the internet.

The communication bus 110 optionally includes circuitry (sometimes called a chipset) that interconnects and controls communications between system components.

In some embodiments, a data extraction system for processing data extraction includes a server system 100. In some embodiments, a data extraction system for processing data extraction includes a server system 100 that is communicatively connected to one or more remote third party systems 210 and/or image capturing devices 200 (e.g., via a network 170 and/or an I/O subsystem 108). In some embodiments, the data extraction system receives n data extraction request (e.g., from an image capturing device 200 that captures an image of a document and/or from a remote third party system 210 that receives an image of a document from a user device). For example, the data extraction request is a request to extract information corresponding to a user from a captured image of a document (e.g., a user that is a party to a transaction or a user that is requesting access to a system or physical location). Remote third party system 210 is, for example, a system of a merchant, bank, transaction processor, computing system or platform, physical access system, or another user.

Figure 2:
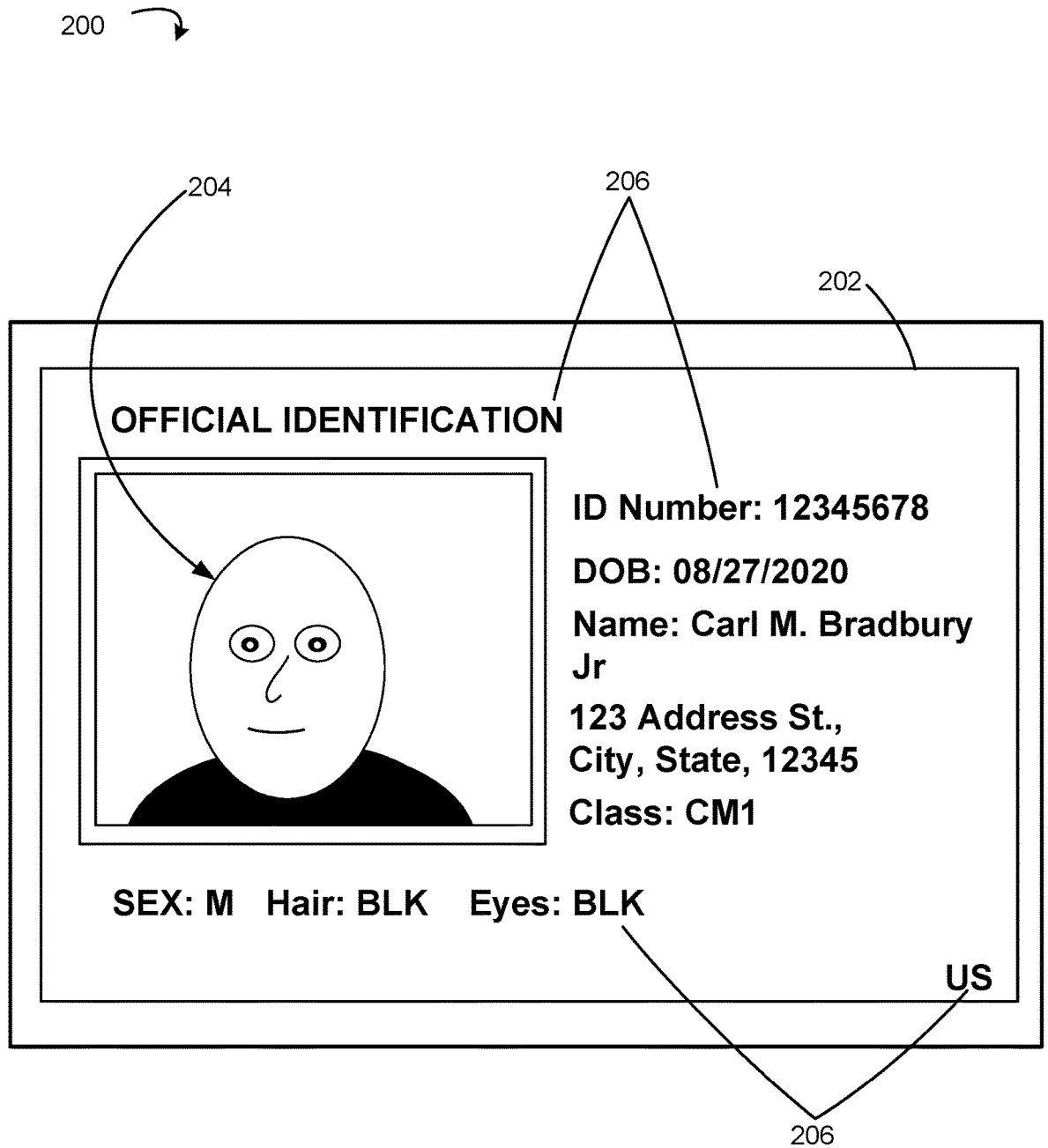
FIG. 2 illustrates an image of a document corresponding to a document configuration, in accordance with some embodiments.

In some embodiments, a data extraction request includes image data that includes an image of a document, such as document image 200 illustrated in FIG. 2. For example, document image 200 is an image of an identification document for a user captured via an image capture device 200 (e.g., a user device and/or kiosk with a camera, scanner, video camera etc.) and/or provided by a remote third party server 210. In some embodiments, the document image 200 is processed to determine document criteria, the document criteria including a document type and/or document characteristics, such as formatting for a corresponding document; labels for alphanumeric portions of the document; and/or extraneous information corresponding to the document and/or document type (e.g., anchors such as "FN" for first name, "LN" for last name, etc.). In some embodiments, the document criteria is determined from the document metadata (as discussed in FIG. 1). In some embodiments, the data extractions server 100 utilizes the determined document criteria to extract and standardize information (e.g., sanitize, remove anchors, apply a predetermined format, label extracted information according to mapped labels, etc.), and/or stores the extracted document information. In some embodiments, the data extraction server 100 transmits the extracted document information to an image capturing device and/or a third party.

FIG. 2 illustrates a document image 200, in accordance with some embodiments. In some embodiments, document image 200 includes a document 202 with facial image data 204 and/or document fields 206. In some embodiments, document 202 is a document type such as an identification document (e.g., a government-issued identification document such as a passport or driver's license), invoice (e.g., utility bill, phone bill, etc.), credit card, debit card, facility access card, security card, etc. For example, document image 200 is an image of an identification document 202 that includes facial image data 204 and/or one or more document fields 206. The document fields 206 include textual information corresponding to document 200. Textual information as used herein, includes, letters, words, numbers, symbols, markers and/or insignia (e.g., document identifying information), other alphanumeric information, and/or combinations thereof. In some embodiments, document 202 includes barcodes and/or machine-readable zones.

In some embodiments, a document type for document 202 includes one or more document characteristics, such as formatting for a corresponding document (e.g., format for text, format for dates, positioning of document fields 206 and/or facial image data 204, etc.), anchors (e.g., "FN" for first name, "LN" for last name, etc.), document layout (e.g., landscape and/or portrait layout), etc. For example, document 202 has a landscape layout with facial image data 204 and document fields 206 in predetermined locations. In some embodiments, the predetermined format includes a font, a font size, a date format (e.g., MM/DD/YYYY, MM/DD/YY, YY-MM-DD, and/or other variations). In some embodiments, the one or more document characteristics include the order and organization of document fields 206 (e.g., name included on one line instead of multiple lines; order of first name, middle name, last name, and/or suffix; acronyms; etc.). For instance, document 202 includes the name "Carl M. Bradbury Jr" as a single string of text, the single string of text utilizing two lines of document 202 (including a line corresponding to a last name document field 206*a* and a line corresponding to a first name document field 206*b*).

In some embodiments, document fields 206 include fields for a name (e.g., first, middle, last name, prefix, suffix, etc.), an address (e.g., street, city, country, etc.), a document number, dates (e.g., date of birth, expiration date, date of issue, etc.), a document type and/or class (e.g., passport, driver's license, identification, etc.), user specific information (e.g., sex, hair color, eye color, weight, height, handwritten signature, restrictions (e.g., correction lenses), and/or other information).

Figure 3:
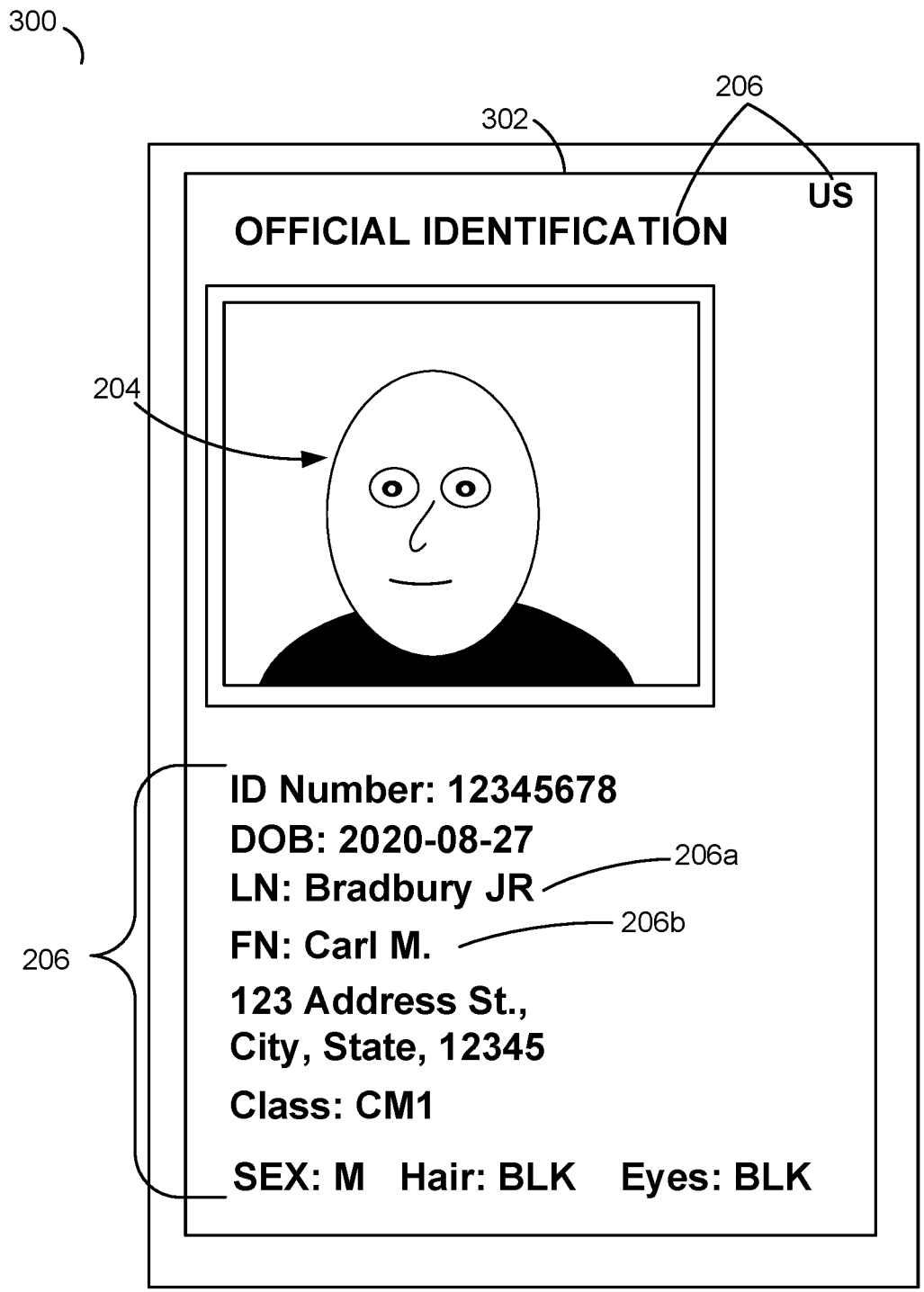
FIG. 3 illustrates another image of a document corresponding to a different document configuration, in accordance with some embodiments.

FIG. 3 illustrates another document image 300, in accordance with some embodiments. Document image 300 includes document 302, facial image data 204, and document fields 206. Document 302 is analogous to document 202 and illustrates a portrait layout. Document image 300 is, for example, an image of an identification document 302 that includes facial image data 204 and document fields 206 as described above in FIG. 2. FIG. 3 illustrates document 302 with one or more distinct characteristics. For example, document 302 includes a distinct format for DOB (e.g., 2020-08-27 vs 08/27/2020), includes anchors (e.g., "FN" for first name and/or "LN" for last name). Document 302 includes distinct document characteristics for the order and organization of document fields 206. For example, document 302 includes the name "Carl M. Bradbury Jr" split into individual strings of text (e.g., strings of text for "Carl M." and "Bradbury JR"), the individual strings of text include anchors 406*a* (e.g., "LN" and "FN"), and the individual strings of text are ordered with a last name before the first name.

Figure 4C:
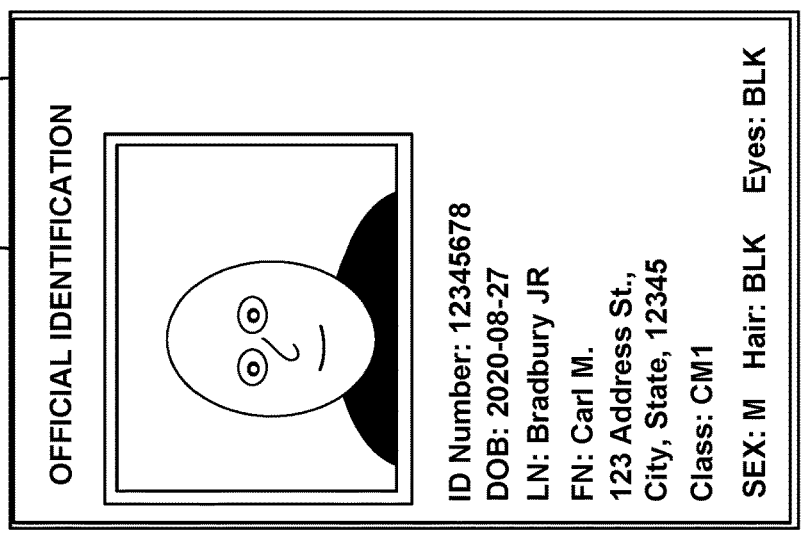
FIGS. 4A-4C illustrate a rectification process for an image of a document, in accordance with some embodiments.
Figure 4B:
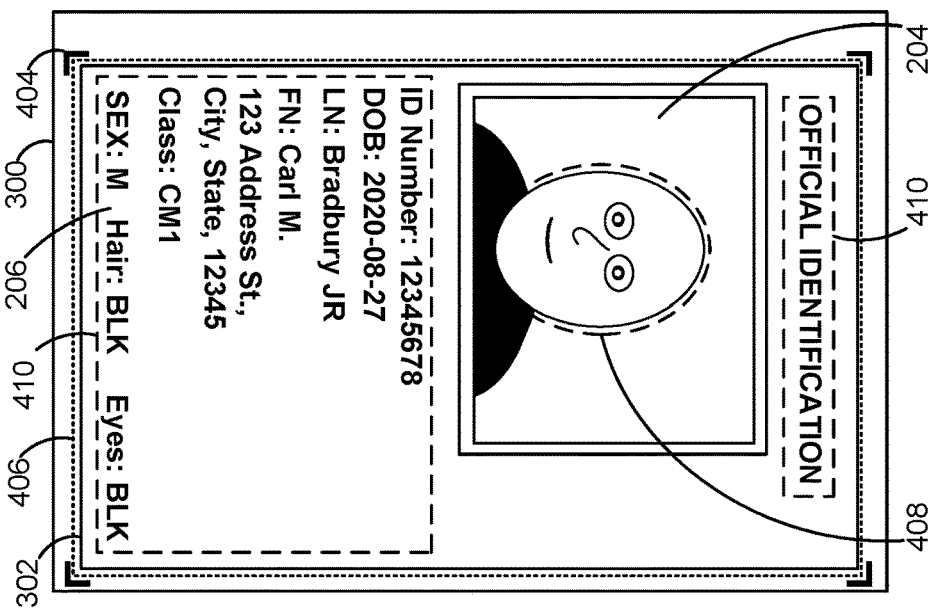
Figure 4A:
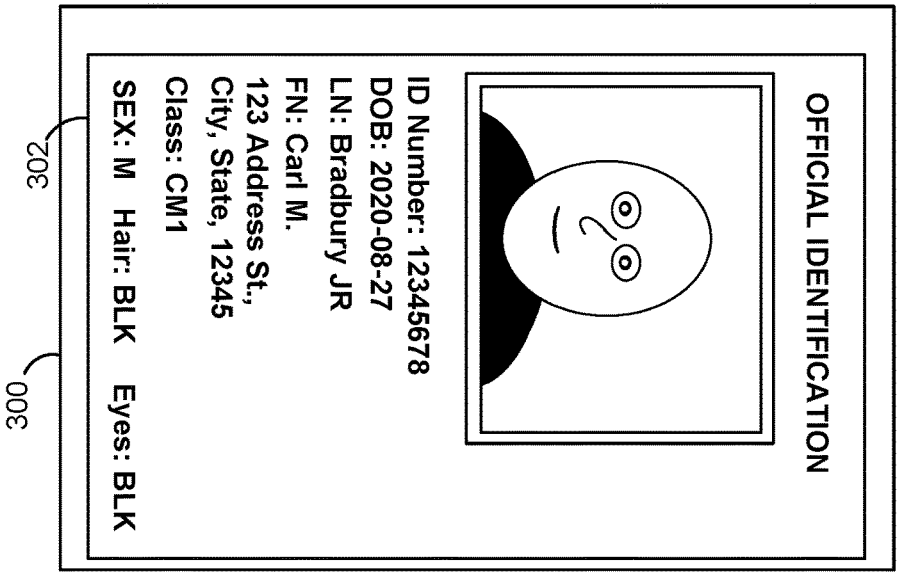

In some embodiments, the data extraction server 100 adjusts the orientation and/or position of the document 202/302 via a rectifier to improve the accuracy and/or efficiency of the data extraction. FIGS. 4A-4C illustrates the determination and adjustment of a document 202/302 in accordance with some embodiments. In some embodiments, data extraction server 100 receives a document image 200/300 that includes a document 202/302 in an upside down and/or skewed (rotated and/or tilted to the left and/or right) orientation and/or position. For example, as illustrated in FIG. 4A, a document image 300 is received with document 302 in an upside down orientation and/or position.

In some embodiments, data extraction server 100 determines a portion of document image 200/300 that includes a document 202/302. Additionally and/or alternatively, in some embodiments, determining the portion of a document image that includes a document includes determining the orientation and/or position of the document. In some embodiments, a rectifier (e.g., rectifier module 128; FIG. 1) is utilized to determine the portion of document image that includes a document and/or the orientation and/or position of the document image. In some embodiments, the rectifier uses different techniques to determine the portion of document image that includes a document and/or the orientation and/or position of the document image. The techniques utilized by the rectifier include identifying the corners of document and/or cropping a portion of document image data for further analysis.

In some embodiments, the rectifier (e.g., rectifier module 128; FIG. 1) identifies corners 404 of a document 202/302. For example, in FIG. 4B, the rectifier determines corners 404 of document 302 included in document image 300. In some embodiments, the rectifier determines the location of the identified corners 404 to determine the portion of document image 300 that includes document 302 and/or the orientation of the document 202/302. In some embodiments, corners 404 are utilized to determine document characteristics corresponding to the document type, such as a predetermined layout. For example, in some embodiments, corners 404 are used to determine that document 302 has a portrait layout.

Alternatively and/or additionally, in some embodiments, the data extraction server 100 receives from a classifier (e.g., document classifier 122) a document type. In some embodiments, the document type is used in conjunction with the rectifier to determine the locations for corners 404. For example, in some embodiments, a document type corresponding to a passport includes document characteristics distinct from a document type for a driver's license. The distinct characteristics include distinct dimensions, such as different heights and/or widths. The rectifier utilizes the received document type to improve the accuracy and/or efficiency in determining corners 404.

In some embodiments, a rectifier crops a portion of the document image 200/300 that includes a document 202/302. For example, as illustrated in FIG. 4B, the rectifier identifies a portion of document image 300 that includes document 302 and crops document 302. Alternatively and/or additionally, in some embodiments, the rectifier utilizes the determined corners 404 to determine the portion of document image 300 that includes document 302 and crops document 302 in accordance with the determined corners. For example, cropped document 406 is based on the determined portion of document image 300 that includes document 302 as defined by corners 404.

In some embodiments, cropped document 406 is used by the rectifier to determine the orientation and/or position (e.g., via orientation identifying module 132; FIG. 1) of document 302 included in the document image 300. In some embodiments, the rectifier determines the orientation and/or position of document 302 by determining facial features 408 (and/or facial image data 204) in cropped document 406 (e.g., document 302). In some embodiments, determining facial features 408 includes determining the location of the facial features 408 within cropped document 406. For instance, in some embodiments, the rectifier determines the location of facial feature 408 (e.g., eyes, mouth, nose, ears, etc.) within cropped document 406. In some embodiments, determining facial image data 204 includes determining the location of the facial image data 204) within cropped document 406. For example, in some embodiments, the location of facial image data 204 is determined to be at the top left, middle, bottom left, top right, top left, etc., of cropped document 406.

In some embodiments, the facial features 408 within cropped document 406 are used to determine the orientation of document 302. In some embodiments, the orientation of document 302 is determined based on the location and/or position of facial features 408. In some embodiments, the position and/or location of eyes, mouth, nose, ears, etc. in relation to each other are used to determining orientation of document 302. For example, the location of a mouth over a nose over the eyes indicate document 302 is upside down. In some embodiments, other variations of the determined location of facial features 408 are used to determine whether document 302 is skewed and/or tilted in any way.

Alternatively and/or additionally, in some embodiments, the determined location of the facial features 408 (and/or the facial image data 204) with respect to a document type is used to determine the orientation and/or position of document 302. In some embodiments, a document type includes a predetermined facial image location. In some embodiments, the predetermined facial image location is a top, middle, bottom, left, right of the document, and/or any combination thereof. For example, a first document type (e.g., passport and/or first country) has a first predetermined facial image location (e.g., top left) and a second document type (e.g., driver's license and/or second country) has a second predetermined facial image location (e.g., top right). The determined location of the facial features 408 and/or facial image data 204 is compared with the predetermined facial image location of the document type to determine the document orientation.

In some embodiments, a document characteristic (e.g., a document layout, such as landscape and/or portrait) is used to determine the orientation and/or position of document 302. In some embodiments, a document characteristic is used in conjunction with the facial features 408 and/or facial image data 204 to determine the orientation and/or position of document 302. For example, document 302 includes a document characteristic for a portrait layout and the portrait layout is used in conjunction the a determined location of facial features 408 and/or facial image data to determine a document orientation.

In some embodiments, a rectifier determines the orientation and/or position of document 302 by identifying document fields 206 within cropped document 406. Additionally and/or alternatively, in some embodiments, the rectifier determines a location 410 for the identified document fields 206. In some embodiments, the orientation and/or position of document 302 is determined based on locations 410 for the identified document fields 206 (e.g., relative to those in the document image). For instance, in FIG. 4B, a greater number of identified document fields 206 are located near the top of document 302 indicating that document 302 is upside down. In some embodiments, the location 410 for the identified document fields 206 with respect to facial features 408 and/or facial image data 204 is used to determine whether document 302 is upside down, tilted, skewed, and/or or upright (e.g., document fields 206 above facial image data 204). As an example, a location 410 for the identified document fields 206 to the left, right, above, and/or below facial features 408 and/or facial image data 204 is used to determine the orientation and/or position of document 302.

In some embodiments, the orientation of document 302 is determined by utilizing the location 410 for the identified document fields 206 in conjunction with a data type and/or document characteristic in a similar manner as discussed above with facial features 408 and/or facial image data 204. For instance, in some embodiments, a document type includes a predetermined document field location, a predetermined document field order (e.g., first name followed by last name), predetermined document field data (e.g., passport, driver's license, country, etc.), etc. The determined document fields 206 are compared with the document type to determine the orientation and/or position of document 302. In some embodiments, the document layout is used in conjunction with the locations 410 for the identified document fields 206 to determine the orientation of document 302. For example, document 202 has a landscape portrait with a greater number of document fields 206 located to the right of facial image data 204. A greater number of identified document fields (e.g., 206) located above facial image data indicates that document 202, with a landscape layout, is rotated.

In some embodiments, the determined orientation and/or position of document 302 within cropped document 406, as discussed above, is used to determine whether orientation criteria are met. In some embodiments, the orientation criteria includes an upright orientation and/or position. The upright orientation is based on predetermined locations of facial features. For example, the predetermined locations of facial features include eyes over nose over a mouth, eyes over mouth, eyes over chin, and/or other variations that indicate an upright image. In some embodiments, the orientation criteria is based on other facial image data, such as positions of shoulders in relation to facial features.

In some embodiments, the orientation criteria is based, in part, on the document type and/or a document characteristic (e.g., landscape and/or portrait layout). For example, a document type for a passport, driver's license, identification card, security card, access card, etc., is used to determine an upright position for the orientation criteria (e.g., based on the corresponding format and/or other document characteristics for the document type). In some embodiments, document characteristics are used to determine the orientation criteria. For example, document characteristics for a portrait and/or landscape layout are used to determine an upright position to be used in the orientation criteria.

In some embodiments, after a determination that the orientation of document 302 in cropped document 406 does not meet the orientation matching criteria, the rectifier adjusts (e.g., via adjustment module 134) cropped document 406 to meet the orientation criteria. For example, in FIG. 4B, document 302 is determined to be upside-down and cropped document 406 is adjusted to meet the orientation criteria (e.g., cropped document 406 is adjusted into an upright position). In some embodiments, a document 202/302 within cropped document 406 is skewed and/or tilted and the cropped document 406 is adjusted to meet the orientation criteria, (e.g., cropped document 406 is adjusted into an upright position). For instance, in some embodiments, a document 202/302 is rotated at an angle (e.g., 1 degree from 359 degrees) from the orientation criteria (e.g., the orientation criteria is an upright position; where the upright position is the reference point at 0 degrees). For example, in some embodiments, a document 202/302 within cropped document 406 is determined to be rotated 40 degrees from the orientation criteria and cropped document 406 is rotated to meet the orientation criteria (e.g., such that the document 202/302 is upright).

In some embodiments, after the orientation criteria is met, the rectifier provides a rectified image 412 (e.g., adjusted cropped document 406 that includes document 202/302). The rectified image 412 is used for further processing and analysis, as discussed herein. The rectified image 412 removes extraneous image data included in document image 200/300. For example, as illustrated in FIG. 4C, rectified image 412 includes cropped document 406 and does not include additional portions of document image 200/300. After rectifying, the rectified image 412, including document 302, is in an upright position.

Figure 5:
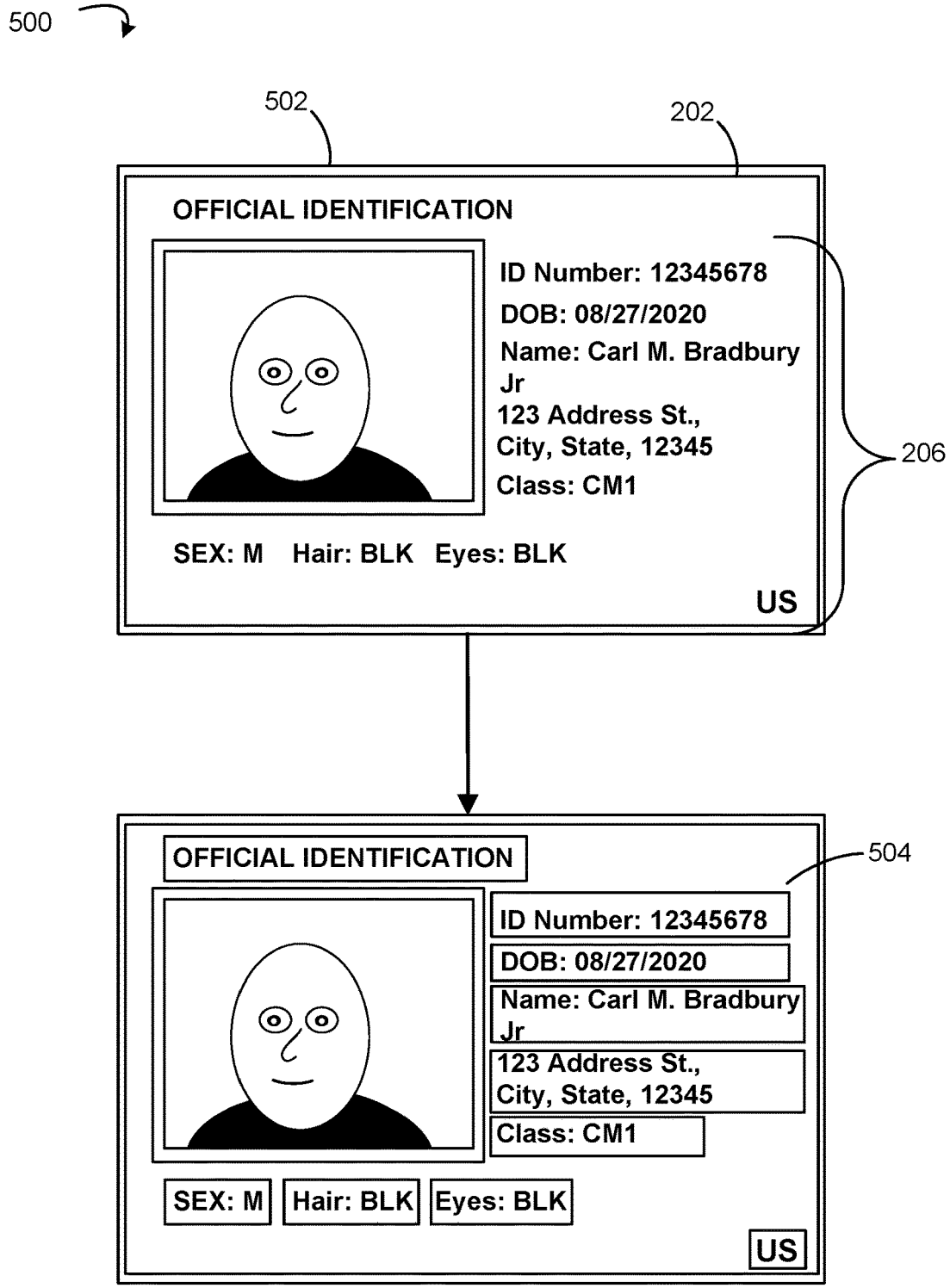
FIG. 5 illustrates the generation of bounding boxes for information in a document, in accordance with some embodiments.

FIG. 5 illustrates determining text within a document and generating bounding boxes for document fields of a document. In some embodiments, data extraction server 100 localizes (e.g., via text localizer module 136) text within document fields 206. In some embodiments, the text is localized within a document 202/302 in document image 200/300 and/or rectified image 412. For example, the text localization process 500 illustrates determining text and generating bounding boxes 504 for document fields 206 of document 202 within a rectified image 502.

In some embodiments, locating text within document fields 206 includes determining text saliency (e.g., the readability, visibility, and/or detectability of the text). For example, in some embodiments, document 202/302 included in document image 200/300 and/or rectified image (e.g., 412 and/or 502) is a poor quality capture (e.g., poor resolution), includes obstructions, and/or includes damaged and/or unreadable portions. In some embodiments, the document image 200/300 and/or rectified image (e.g., 412 and/or 502) is processed to improve saliency. In some embodiments, a text saliency value is determined for the document fields 206 and compared with text saliency criteria. In some embodiments, based on a determination that the text saliency criteria is met, the text of document field 206 is localized. In some embodiments, based on a determination that the text saliency value does not meet the text saliency criteria, the data extraction server 100 requests a new document image 200/300.

In some embodiments, the localized text of document field 206 is used to generate bounding boxes 504. In some embodiments, the generated bounding box 504 encloses an area determined for the localized text of document field 206. Alternatively and/or additionally, in some embodiments, the generated bounding boxes 504 enclose the localized text of document fields 206. For example, as illustrated in FIG. 5, document fields 206 are enclosed by generated bounding boxes 504. In some embodiments, bounding boxes 504 are generated for individual document fields 206. For example, as illustrated in FIG. 5, document fields 206 corresponding to document type, document number, date of birth, name, address, etc., are individually enclosed by generated bounding boxes 504.

Figure 6:
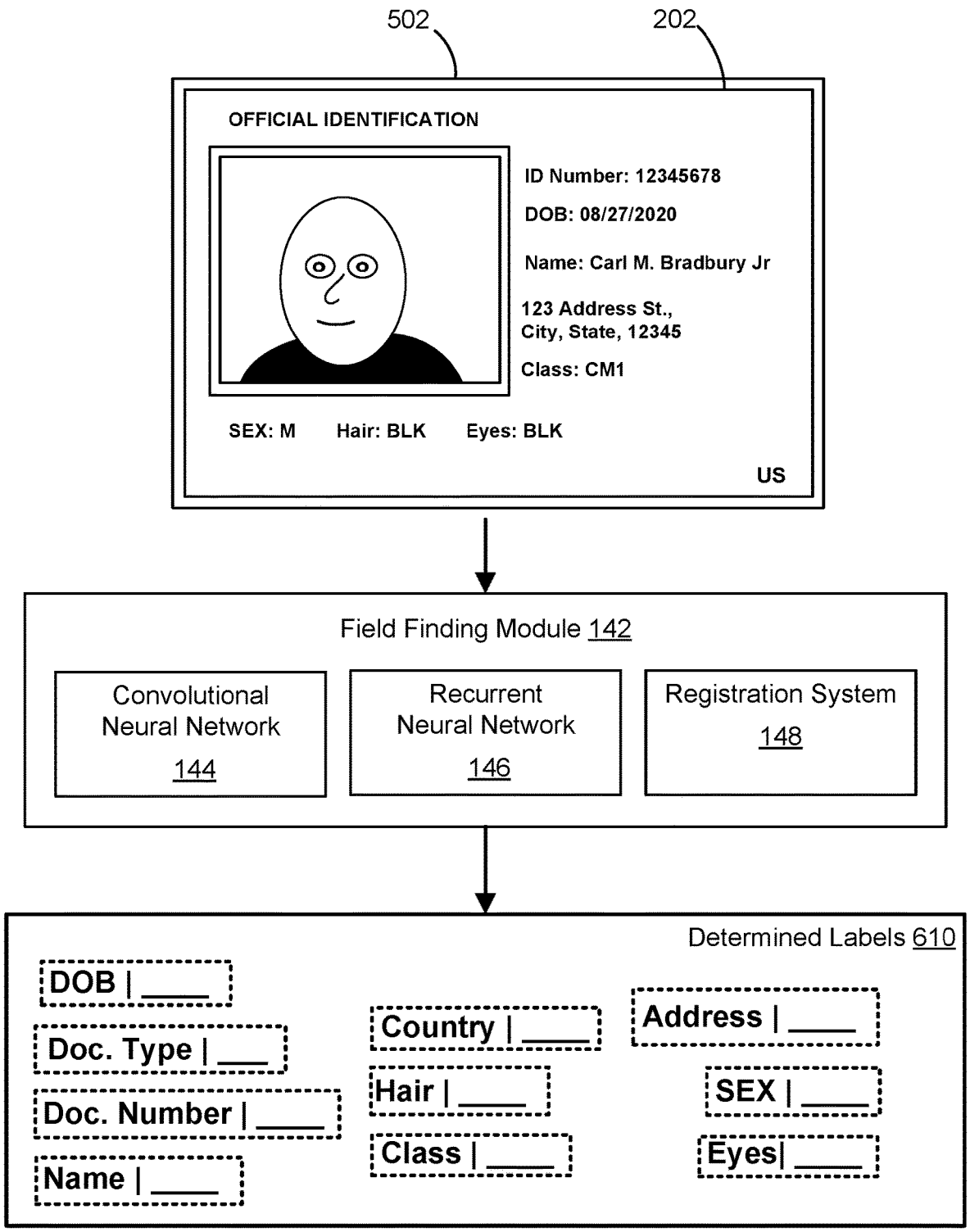
FIG. 6 illustrates a determination of labels for a document utilizing a field finding system that includes one or more neural networks, in accordance with some embodiments.

FIG. 6 illustrates utilizing field finding module 142 (also sometimes referred to as a neural network system) to assigning labels to document fields 206 and/or generated bounding boxes 504 in accordance with some embodiments. In some embodiments, the field finding module 142 includes a plurality of distinct systems, such as a registration system 148, a recurrent neural network (RNN) 146, and/or a convolutional neural network (CNN) 144. In some embodiments, the field finding module 142 uses at least two of the registration system 148, the RNN 146, and/or the CNN 144 to assign labels to the document. In some embodiments, the at least two of the registration system 148, the RNN 146, and/or the CNN 144 operate at the same time. For instance, the registration system 148, the RNN 146, and/or the CNN 144 determine labels concurrently. In some embodiments, the plurality of distinct systems of field finding module 142 are combined to determine labels for document fields 206 and/or generated bounding boxes 504. For example, in some embodiments, labels corresponding to document fields 206 and/or generated bounding boxes 504 determined using the CNN 144 are combined with labels corresponding to document fields 206 and/or generated bounding boxes 504 determined using the registration system 148.

In some embodiments, determining a label corresponding to document fields 206 and/or generated bounding boxes 504 using the plurality of distinct systems of field finding module 142 includes determining relevance values corresponding to the determined labels 610. For example, the plurality of distinct systems of field finding module 142 determine labels corresponding to document fields 206 (e.g., date of birth, document number, address, name, etc.) and/or generated bounding boxes 504 as well as relevance values corresponding to the labels 610. In some embodiments, the individual systems of the plurality of distinct systems of field finding module 142 determine respective relevance values corresponding to the determined labels. For example, the registration system 148 determines a first set of corresponding relevance values and the CNN 144 determines a second set of corresponding relevance values for the labels 610.

In some embodiments, the field finding module 142 determines whether the relevance values corresponding to the labels 610 determined by a first system meet relevance threshold. In some embodiments, if relevance values for the labels 610 meet the relevance threshold, the data extraction server 100 maps (e.g., assigns) the labels 610 to the document fields 206 and/or generated bounding boxes 504. In some embodiments, if relevance values for the labels 610 determined by the first system do not meet the relevance threshold, the field finding module 142 selects a second system to labels 610 corresponding to document fields 360 and/or generated bounding boxes 504. For example, the field finding module 142 utilizes the registration system 148 to determine labels 610 corresponding to document fields 360 and/or generated bounding boxes 504. Further, the registration system 148 determines first relevance values for the labels 610 with respect to the document fields 360. The first relevance values are compared with relevance threshold, and, based on a determination that the first relevance values do not meet the relevance threshold, the field finding module 142 selects a distinct system (e.g., CNN 144 and/or RNN 146).

In some embodiments, sets of relevance values generated by the plurality of distinct systems of field finding module 142 are compared to determine the labels 610 with the highest relevance values. For example, a first set of relevance values for labels 610 determined using the registration system 148 are compared with a second set of relevance values for labels 610 determined using the CNN 144 and/or the RNN 146. The set of labels 610 with the highest relevance values determines the individual system of the plurality of distinct systems of field finding module 142 used to map (e.g., assign) labels 610. In some embodiments, relevance values corresponding to a particular document field 206 and/or generated bounding box 504 determined by the plurality of distinct systems of field finding module 142 are compared to determine the highest relevance value. For example, a first relevance value corresponding to a label 610 for "country" determined using the registration system 148 is compared to a second relevance value corresponding to a label 610 for "country" determined using the CNN 144 and/or the RNN 146. The label 610 for "country" generated by the individual system of the plurality of distinct systems of field finding module 142 with the highest relevance value between the systems is mapped (e.g., assigned) to the corresponding document field 206 and/or generated bounding box 504.

In some embodiments, a CNN 144 is a deep learning system that is used for image classification (e.g., image recognition, object detection, facial recognition, etc.). In some embodiments, the CNN receives a document image 200/300 and/or rectified image (e.g., 412 and/or 502) and assigns learnable weights and/or biases to various document fields 206 and/or generated bounding boxes 504. The CNN differentiates the various document fields 206 and/or generated bounding boxes 504 from one another and classifies the received image under certain categories (e.g., document type and/or document characteristics) to determine labels 610.

In some embodiments, a RNN 146 is another deep learning system that is used for image classification, image captioning, input classification, language translation, and/or video classification. In some embodiments, the RNN 146 receives a document image 200/300 and/or rectified image (e.g., 412 and/or 502) and process the received document image 200/300 and/or rectified image (e.g., 412 and/or 502) repeatedly to determine the labels corresponding to the document fields 206 and/or generated bounding boxes 504.

Figure 7:
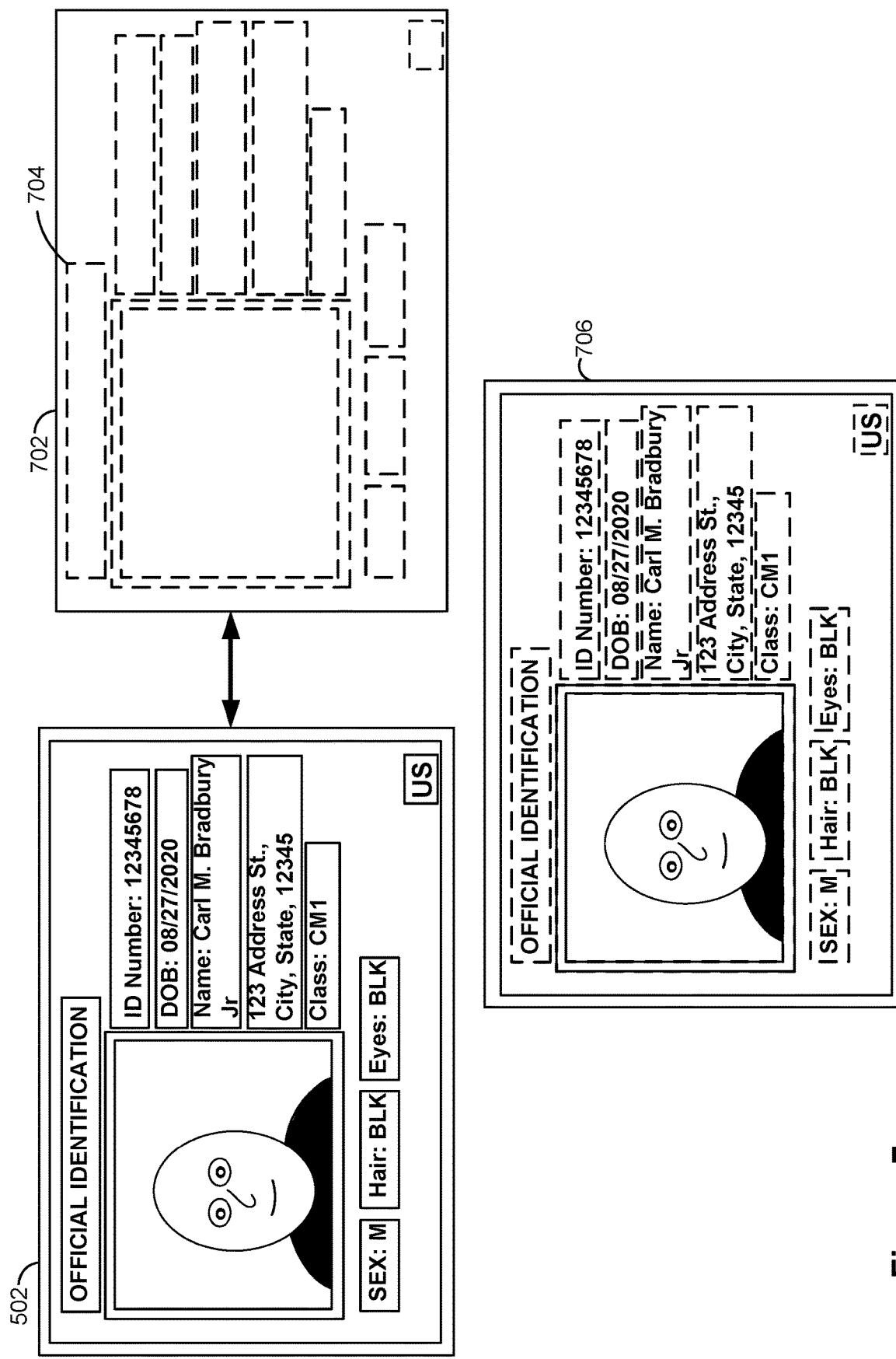
FIG. 7 illustrates a determination of labels for the document utilizing a registration system, in accordance with some embodiments.
Figure 9A:
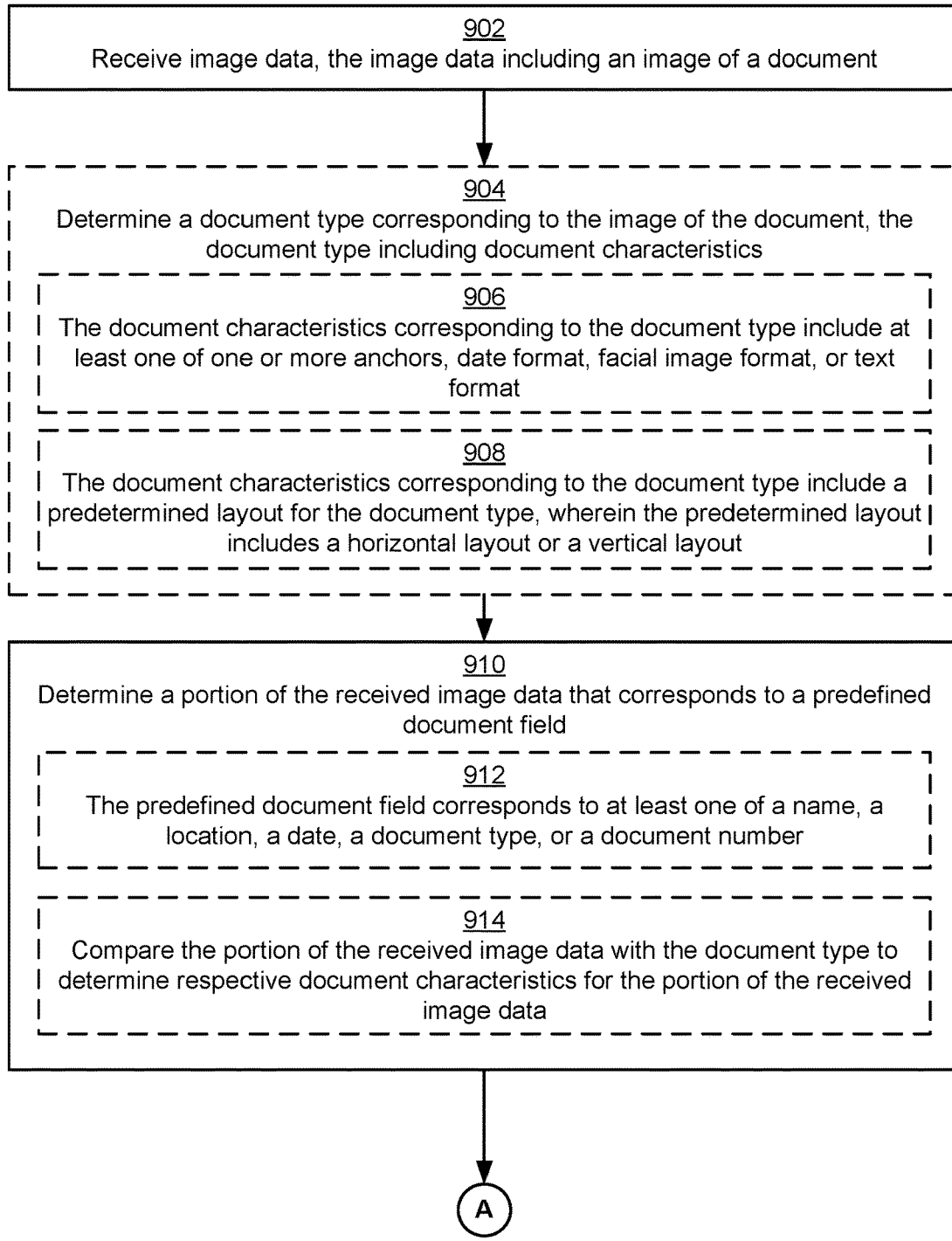
Figure 9D:
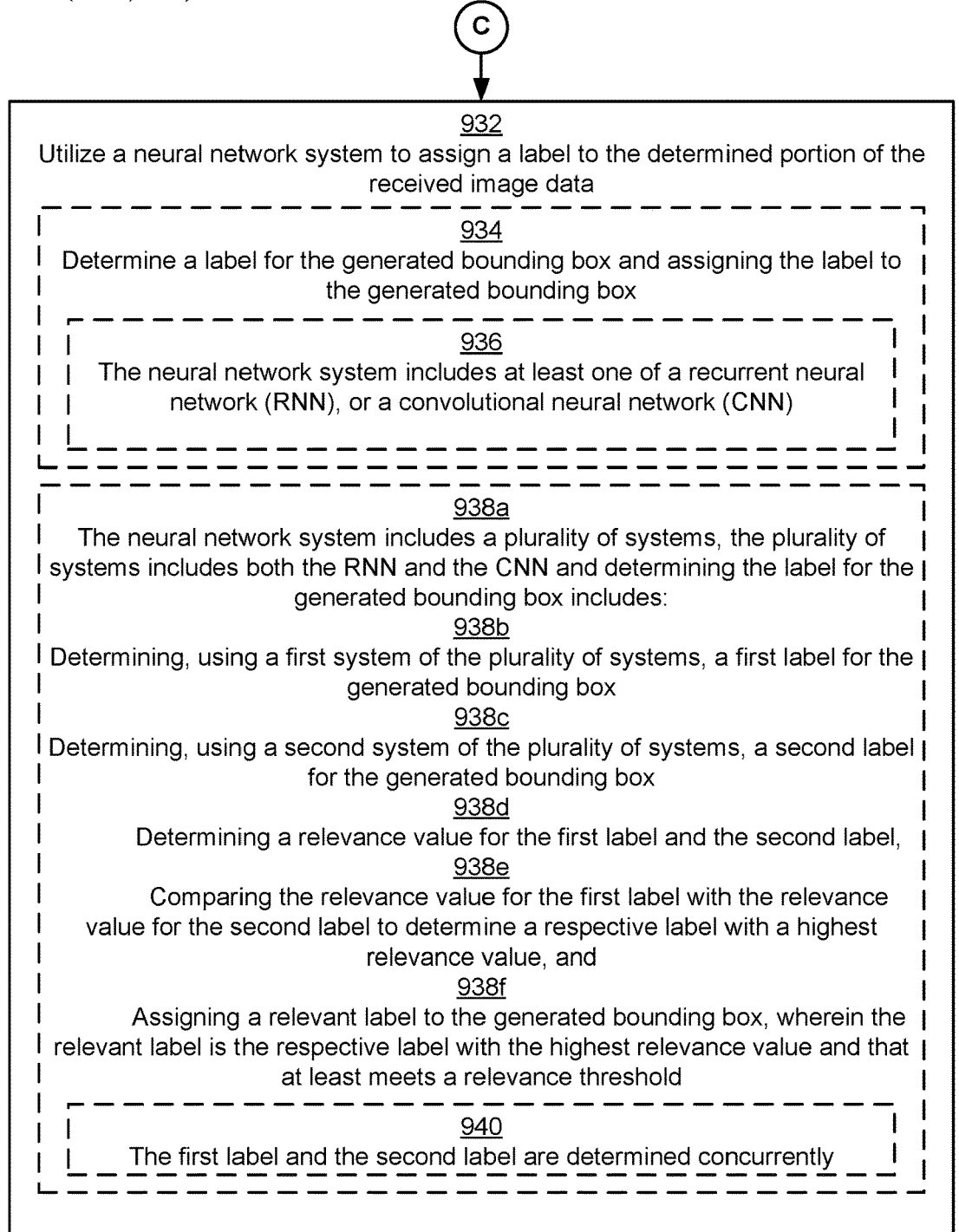
Figure 9G:
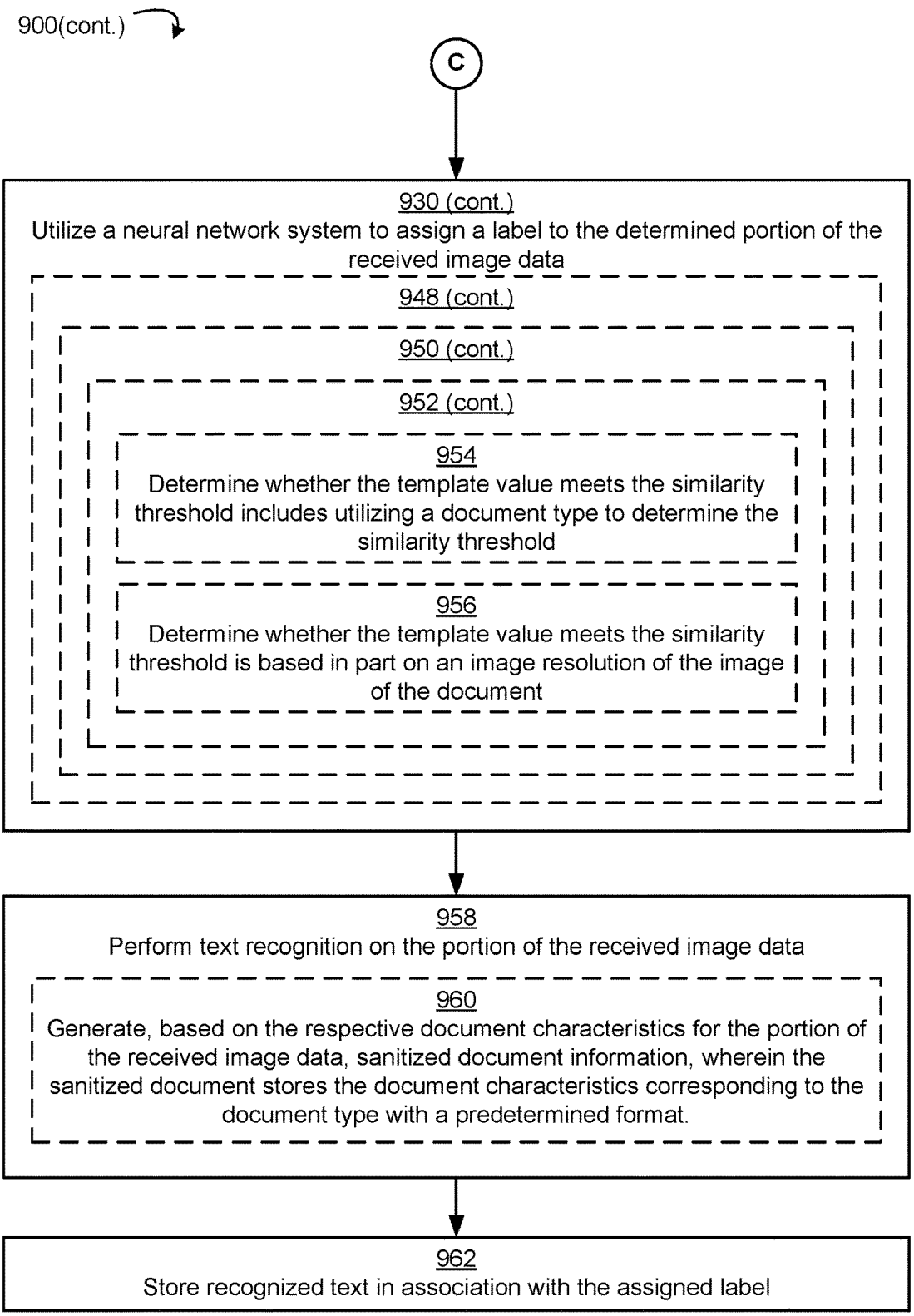

FIG. 7 illustrates example embodiments of a registration system 148. The registration system 148 utilizes document image (e.g., 200 and/or 300) and/or the rectified image (e.g., 412 and/or 502) and a template to determine labels 610 for the document fields 360 and/or generated bounding boxes 504. In some embodiments, the rectified image 502 includes the generated bounding boxes 504. The registration system 148 includes templates 702, the templates 702 including label 704 (e.g., label markers) for different documents and/or document types. For example, in some embodiments, a template 702 corresponds to a driver's license of a first country, the template further includes label 704 for the document fields of the driver's license for the first country.

In some embodiments, the registration system 148 overlays a template 702 over the document image 200/300 and/or the rectified image (e.g., 412 and/or 502). For example, as illustrated in FIG. 7, template 702 is overlaid (e.g., superimposed) 706 over rectified image 502. In some embodiments, the labels 610 are based on the document fields 206 and/or generated bounding boxes 504 included in label 704.

In some embodiments, a template value is generated for an overlaid template 706. In some embodiments, the template value is determined based on a distance from an edge of a document 202/302 to text in document fields 206 and/or generated bounding boxes 504. In some embodiments, the distance is determined by the pixels from the edge of the document 202/302 and the text in document fields 206 and/or generated bounding boxes 504. In some embodiments, the registration system 148 determines whether the template value corresponding to the overlaid template 706 meets similarity threshold. In some embodiments, if the template value meets similarity threshold, the registration system 148 provides the labels 610 associated to the template 702. In some embodiments, if the template value does not meets the similarity threshold, the registration system 148 selects a new template 702, distinct from the first template, to determine labels 610.

FIG. 8 illustrates a mapping 800 of labels, extraction of textual information, and sanitization in accordance with some embodiments. In some embodiments, the labels 610 are mapped (e.g., assigned) to document fields 206 and/or generated bounding boxes 504. In some embodiments, the mapped fields 802 include the text within document fields 206 and/or generated bounding boxes 504 and the associated determined labels.

In some embodiments, data extraction server 100 utilizes the mapped fields 802 to extract text 804. In some embodiments, the text 804 is extracted utilizing character recognition techniques (e.g., character recognition module 118; FIG. 1). In some embodiments, the text 804 is extracted from one mapped field 206 at a time. For example, text 804 is extracted from mapped fields 802 corresponding to "Doc. Type," "Doc. Number," "Address," etc., individually. In some embodiments, the text is extracted from the mapped fields 206 concurrently. In some embodiments, the extracted text 804 has an existing format and/or includes extraneous information from a document 200/300. In some embodiments, the existing format and/or extraneous information corresponds to a determined document type and/or document characteristics of a document 200/300. For example, document 200 corresponding to a particular document type (e.g., driver's license) includes document characteristics such as text size, text formatting (e.g., bolding, all caps, etc.), date formatting (e.g., 08/27/2020), text distribution (e.g., a document field 206 with multiple lines for a full name), abbreviations, etc. In another example, document image 300 corresponds to a distinct and/or similar document type that includes similar and/or distinct document characteristics such as anchors (e.g., "LN" 406*a* for last name), text size, text formatting (e.g., bolding, all caps, etc.), date formatting (e.g., 2020-08-27), text distribution (e.g., single line document field 206 for first name and/or last name), abbreviations, etc.

In some embodiments, the data extraction server 100 sanitizes the extracted text 804. In some embodiments, sanitizing the extracted text 804 includes applying standardized and/or uniform formatting, separating multiline and/or single line text into individual text, etc. For example, the extracted text 804 includes "name," "address," and/or "date" in a format corresponding to the document type, the sanitized document information 806 separates the "name" into a first, middle, and/or last name; "address" into a street address, city, state, and/or zip code; and/or formats the "date" from 08/27/2020 to August 27, 2020. In some embodiments, the sanitizing the extracted text 804 removes the format and/or extraneous information from the extracted text 804. For example, in some embodiments, extracted text 804 includes anchors (e.g., "LN" 406*a* for last name) and the sanitized document information 806 removes the anchors. In some embodiments, the sanitized document information 806 removes acronyms and/or codes. For example, "BLK" is changed to "Black," "CM1" for class is changed to "Car/Motorcycle," etc.

In some embodiments, the sanitized document information 806 is stored to be accessed by the image capturing device 200 and/or remote third party 210. In some embodiments, the sanitized document information 806 is transmitted to the image capturing device 200 and/or remote third party 210.

FIGS. 9A-9G illustrate a flow diagram illustrating a method 900 for a data extraction system for extracting information from a document, in accordance with some embodiments. The method is performed at a data extraction server 100, image capture device 200, and/or a remote (e.g., third-party) extraction database 160. For example, instructions for performing the method are stored in the memory 102 and executed by the processor(s) 104 of the data extraction server system 100.

The device receives (902) image data, the image data includes an image of a document (e.g., as described in FIGS. 2 and 3). In some embodiments, the document is distinct and separate from the image data. In some embodiments, the image data includes additional portions that are not part of the image of the document. For example, in some embodiments, the device determines (904) a document type corresponding to the image of the document, the document type including document characteristics. In some embodiments, the device classifies the document as corresponding to (e.g., belonging to) the document type using a neural network. For example, as described in FIGS. 2 and 3, the document type includes a personal identification (e.g., a passport, driver's license), invoice (e.g., utility bill, phone bill, etc.), banking records (e.g., statements), payment card (e.g., credit card or debit card), facility access card, security card, etc. In some embodiments, the device classifies the document from among a plurality of predefined documents types. In some embodiments, the plurality of predefined document types include two or more personal identification document types. For example, the device classifies an image of a passport as a passport, and classifies an image of a driver's license as such. In some embodiments, the plurality of document types includes two or more invoice types (e.g., a utility bill and a phone bill). In some embodiments, the plurality of document types includes two or more payment card types. In some embodiments, the document type is determined by a document classifier (e.g., 122; FIG. 1). The device uses the document classifier 122 to determine document metadata (e.g., via a document service identifier 124). In some embodiments, in accordance with the classification of the document as belong to a respective document type, the device associates the respective document type's document characteristics with the document. In some embodiments, the device associates different document characteristics for different document types.

In some embodiments, the document characteristics corresponding to the document type include (906) at least one or more of the group consisting of: one or more anchors, date format, facial image format, or text format. For example, as described in FIGS. 2 and 4, the document characteristics corresponding to the document type include formatting for text (e.g., font size and location), dates (e.g., date format), locations document fields 206 and/or facial image data; anchors, such as "FN" for first name, "LN" for last name, etc. In some embodiments, the document characteristics corresponding to the document type include (908) a predetermined layout corresponding to the image of the document, wherein the predetermined layout includes a horizontal layout or a vertical layout. In some embodiments, the document characteristics corresponding to the document type are included in the document metadata.

The device determines (910) a portion of the received image data that corresponds to a predefined document field. In some embodiments, the portion of the received image data the corresponds to the predefined document field occupies a subset, less than all, of the document. In some embodiments, the predefined document field corresponds (912) to at least one of a name, a location, a date, a document type, or a document number. For example, as shown in FIGS. 2 and 3, document fields 206 include information such as a name, a date of birth, an address, a document type (e.g., official identification), and/or other personally identifiable information. In some embodiments, the device compares (914) the portion of the received image data with the document type to determine respective document characteristics for the portion of the received image data.

In some embodiments, the device determines (916a) a saliency value for the predefined document field. The device determines (916b) whether the saliency value for the predefined document field meets a predetermined saliency threshold and, in accordance with a determination that the saliency value does not meet the predetermined saliency threshold, requests (916c) new image data that includes an image of the document. Alternatively and/or additionally, in some embodiments, in accordance with a determination that the saliency value meets the predetermined saliency threshold, the device generates (918a) a bounding box for the predefined document field and performs (918b) text recognition on the generated bounding box (e.g., the portion defined by a bounding box). For example, as illustrated in FIG. 5, bounding boxes 504 are generated for the document fields 206 of rectified image 502. In some embodiments, text recognition is performed on the generated bounding boxes 504.

In some embodiments, the device determines (920a) a position of the image of the document. The device determines (920b) whether the position of the image of the document meets orientation criteria and, in accordance with a determination that the position of the image of the document meets orientation criteria, utilizes (920c) a neural network to assign a label to the determined portion of the received image data. For example, as described in FIGS. 4A-4C, data image 300 is utilized to determine a position and/or orientation of document 302. In some embodiments, determining the position of the image of the document includes (922) identifying respective corners of the image of the document and comparing the respective corners of the image of the document with document characteristics corresponding to a document type to determine the position of the document. For example, as illustrated in FIGS. 4A-4C, document image 300 includes document 302 that includes document characteristics corresponding to a document type with a portrait layout and the portrait layout is compared with the respective corners to determine the position of the document. The document characteristics corresponding to document 302 are used to determine the position and/or orientation of document 302.

In some embodiments, the image of the document includes (924a) facial image data and determining (924b) the position for the image of the document includes determining one or more facial features corresponding to the facial image data. In some embodiments, the device determines (924c) the position of the image of the document of the image data based on the one or more facial features. For instance, as described in FIGS. 4A-4C, document 302 includes facial image data 204 and facial features 408. The device utilizes the facial features 408 to determine the position and/or orientation of document 302. In some embodiments, the device detects two or more facial features (e.g., eyes and a nose) determines the orientation of the document based on the relative orientation of the two or more facial features) (e.g., when the eyes are above the nose, the document is determined to be upright; when the eyes are next to the nose, the document is determined to be sideways; when the eyes are below the nose, the document is determined to be upside down). Alternatively and/or additionally, in some embodiments, the predefined document field includes (926a) text and the position of the document is determined (926b), based on a text position of the text in the document field. For example, as further illustrated in FIGS. 4A-4C, locations 410 of determined document fields 206 are utilized to determine the position and/or orientation of document 302.

In some embodiments, determining the position of the image of the document includes cropping (928) the portion of the received image data. For example, as illustrated in FIGS. 4A-4C, cropped document 406 includes document 302. In some embodiments, the cropped portion of document image 200 and/or 300 is determined by corners 404. Additionally and/or alternatively, in some embodiments, the cropped document 406 is used to efficiently process the image of the document. For example, in some implementations, the cropped document 406 is used for determining facial features 408, document fields 206, determining orientation, utilizing a neural network, and/or other features described herein.

In some embodiments, in accordance with a determination that the position of the image of the document does not meet the orientation criteria, the device adjusts (930a) the image of the document to satisfy the orientation criteria. In accordance with a determination that the position corresponding to the adjusted image of the document meets the orientation criteria, the device performs (930b) text recognition on the adjusted image of the document. For example, as illustrated in FIG. 4C, document image 300, in particular, document 302 is adjusted to be in an upright position. In some embodiments, cropped document 406 is adjusted to meet the orientation criteria.

The device utilizes (932) a neural network system to assign a label to the determined portion of the received image data. In some embodiments, the label identifies the predefined document field. For instance, field finding module 142 receives a document image 200 and determines labels 610 for a portion of the received image data that corresponds to a predefined document field. Alternatively and/or additionally, in some embodiments, the field finding module 142 receives a rectified image (e.g., 502) and determines labels 610 for the corresponding document fields (e.g., 206). In some embodiments, the device determines (934) a label for the generated bounding box and assigns the label to the generated bounding box. For example, as illustrated in FIG. 8, mapped fields 802 include determined labels for respective generated bounding boxes corresponding to data fields (e.g., 206). In some embodiments, the neural network system includes (936) at least one of a recurrent neural network (RNN), or a convolutional neural network (CNN). In some embodiments, registration system 148 is a neural network. In some embodiments, the neural network system includes registration system 148.

In some embodiments, the neural network system includes (938a) a plurality of neural networks, the plurality of neural networks including both the RNN and the CNN. Determining the label for the generated bounding box includes determining (938b), using a first system of the plurality of neural networks, a first label for the generated bounding box, determining (938c), using a second system of the plurality of neural networks, a second label for the generated bounding box. The device determines (938d) a relevance value for the first label and the second label, compares (938e) the relevance value for the first label with the relevance value for the second label to determine a respective label with a highest relevance value, and assigns (938f) a relevant label to the generated bounding box, wherein the relevant label is the respective label with the highest relevance value and that at least meets a relevance threshold. For example, in FIG. 6, field finding module 142 includes a CNN 144, a RNN 146, and/or a registration system 148 and the respective systems are used to determine labels 610. Respective relevance values corresponding to the labels 610 for the respective system are compared to determine the highest relevance value. In some embodiments, the first label and the second label are determined (940) concurrently. For instance, in some embodiments, labels 610 determined using the CNN 144, the RNN 146, and/or the registration system 148 are determined at the same time.

In some embodiments, the neural network system includes (942a) a plurality of neural networks, the plurality of neural networks both the RNN and the CNN. Determining the label for the generated bounding box includes determining (942b), using a first system of the plurality of neural networks (e.g., the RNN), a first label for the generated bounding box, determining (942c), using a second system of the plurality of neural networks (e.g., the CNN), a second label for the generated bounding box. The device compares (942d) the first label and the second label to determine whether the first label and the second label match and, in accordance with a determination that the first label and the second label match, assigns (942e) the first label or the second label to the generated bounding box 504. For example, in some embodiments, respective labels 610 determined using the CNN 144, the RNN 146, and/or the registration system 148 are compared and matching labels 610 are assigned to the generated bounding boxes (e.g., 802). In this way, labels 610 determined using distinct systems of field finding module 142 that match are considered accurate.

Alternatively and/or additionally, in some embodiments, in accordance with a determination that the first label and the second label do not match, the device assigns (944) a respective label of the first label or the second label with a highest relevance score (e.g., that at least meets a relevance threshold). For instance, in some embodiments, the RNN 146 determines that a first generated bounding box 504 corresponds to a document number, determines a first label 610 as "document number", and determines a corresponding relevance value; and the registration system 148 determines that the first generated bounding box 504 corresponds to a date of birth, determines a first label 610 as "date of birth", and determines a corresponding relevance value. The determined first label 610 with the highest relevance score (e.g., that at least meets the relevance threshold) between the two systems is assigned to the generated bounding box 504. Alternatively and/or additionally, in some embodiments, the RNN 146 does not determine a first label 610 for a first generated bounding box 504 and the registration system 148 determines that the first generated bounding box 504 corresponds to a date of birth, determines a first label 610 as "date of birth", and determines a corresponding relevance value. Based on a determination that the corresponding relevance value determined by the registration system 148 that at least meets the relevance threshold, the label 610 is assigned to the generated bounding box 504. In this way, an overall set of relevant labels is determined.

In some embodiments, the respective labels include (946) at least one of first name, last name, middle name, address, dates, or license number. For instance, document 202 and/or 302 includes document fields 206 corresponding to personally identifiable information such as name, document number, date of birth, address, etc. The field finding module 142 is utilized to determine respective labels (e.g., labels 610) corresponding to the document information and/or corresponding generated bounding box 504.

In some embodiments, the neural network system (or a field finding module that includes a neural network) includes (948a) a registration system, the registration system includes a first template, wherein the first template includes a first predetermined label, the first predetermined label associated with a first predetermined label location. The registration system determines (948b) whether the first predetermined label corresponds to the generated bounding box 504 by superimposing the first template over the image of the document and compares (948c) the predetermined label location with the generated bounding box 504 to determine a template value. The registration system determines (948d) whether the template value meets similarity threshold and, in accordance with a determination that the template value meets the similarity threshold, determines (948e) a relevant label based on the first predetermined label.

For example, as illustrated in FIG. 7, a template 702 includes predetermined labels 704 that correspond to predetermined locations of document 202 and/or 302 that include document fields 206. The template 702 is superimposed over document 202 and/or 302 or a rectified image thereof (e.g., rectified image 412 and/or 502). The predetermined labels 704 and their corresponding predetermined label locations are compared with document fields 206 and or generated bounding boxes 504 to determine a template value. If it is determined that the template value meets a similarity threshold, predetermined labels 704 are assigned to the document fields 206 and/or generated bounding boxes 504.

Alternatively and/or additionally, in some embodiments, the registration system includes (950a) a second template, the second template including a second predetermined label, the second predetermined label associated with a second predetermined label location. In accordance with a determination that the template value for the first template does not meet the similarity threshold, the registration system 148 determines (950-b) the label for the generated bounding box 504 based on the second template. For example, in some embodiments, the first template (e.g., 704) corresponds to a passport, a driver's license for a distinct country, or a document with distinct characteristics (e.g., landscape and/or horizontal layout) than document 202 and/or 302. If the first template does not meet the similarity threshold, a second template is used to determine labels 610 as discussed above with respect to the first template.

In some embodiments, determining (952) the template value includes determining respective distances between the first predetermined label location and one or more edges of the image of the document, the respective distances measured based on one or more pixels between the first predetermined label location and the one or more edges. For example, in some embodiments, a distance from one or more edges of document 202 and/or 302 in document image 200/300 and/or the rectified image (e.g., 412 and/or 502) to the predetermined label locations associated with the predetermined labels 704 are used to determine respective distances. Alternatively and/or additionally, respective distances are determined between the one or more edges of document 202 and/or 302 and the document fields 206 and/or generated bounding boxes 504. In some embodiments the distances between the predetermined label locations, the document fields 206 and/or generated bounding boxes 504 are compared. In this way, the respective distances are used to determine a template value for the first template.

In some embodiments, determining (954) whether the template value meets the similarity threshold includes utilizing a document type to determine the similarity threshold. For example, in some embodiments, document types (e.g., passport, driver's license, identification, etc.) include predetermined locations for document fields 206. The predetermined locations for document fields 206 are used to determine the similarity threshold. In some embodiments, the registration system 148 determines (956) whether the template value meets the similarity threshold is based in part on an image resolution of the image of the document. For instance, document image 200 and/or 300 captured with poor resolution distorts and/or obscures the location and/or position of document fields 206. In some embodiments, if the location and/or position of document fields 206 cannot be determined, the device a requests for a recapture of document image 200 and/or 300.

The device performs (958) text recognition on the portion of the received image data. The device performs text recognition of document fields 206 and/or generated bounding boxes 504. In some embodiments, the device utilizes document image 200/300 and/or rectified image (e.g., 412 and/or 502) to perform text recognition on the portion of the received image data. For example, text is extracted 804 from document image 200/300 and/or rectified image (e.g., 412 and/or 502) with associated labels 610 (e.g., mapped fields 802; FIG. 8) for the document field 206 and/or generated bounding boxes 504.

In some embodiments, the device generates (960), based on the respective document characteristics for the portion of the received image data, sanitized document information, wherein the sanitized document stores the document characteristics corresponding to the document type with a predetermined format. For instance, in some embodiments, the device uses document metadata of a document type, including document criteria, to sanitize extracted text 804. For instance, sanitized document information 806 removes document specific formatting, applies uniform formatting, and/or splits extracted text 804 into individual document information. For example, as shown in FIG. 8, an individual's full name is broken down into individual fields for first name, last name, and/or middle name; the address is broken down into street, city, state, etc.; abbreviations and/or acronyms are broken out, anchors (e.g., "FN" for first name as illustrated in FIG. 4) are removed, dates are formatted into a standard format, etc.

The device stores (962) recognized text in association with the assigned label. For example, in some embodiments, the device stores extracted text 804 with the associated labels 610 (e.g., mapped fields 802; FIG. 8). Alternatively and/or additionally, in some embodiments, the device stores the sanitized document information 806.

In some embodiments, a method is performed at a server system including one or more processors and memory storing one or more programs for execution by the one or more processors. The method includes receiving image data. The image data includes an image of a document. The method further includes, based on the image of the document, determining a document type corresponding for the document. The document type includes document characteristics for the document type. The method further includes determining a portion of the received image data that corresponds to a predefined document field. The method further includes assigning a label to the determined portion of the received image data. Assigning the label includes determining, using a registration system, a first label for the determined portion of the received image data; determining, using a neural network, a second label for the determined portion of the received image data; and comparing the first label and the second label to determine whether the first label and the second label match; and in accordance with a determination that the first label and the second label match, assigning the first label to the determined portion of the received image data. The method further includes performing text recognition on the portion of the received image data and storing recognized text in association with the assigned label.

In some embodiments, the method further includes, in accordance with a determination that the first label and the second label do not match, assigning a respective label of the first label or the second label with a highest relevance score.

In some embodiments, the method further includes any of the features or operations described above with reference to method 900, FIGS. 9A-9G. In some embodiments, instructions for performing the method are stored in a non-transitory computer-readable storage medium. In some embodiments, the method is executed a device that includes one or more processors and memory (e.g., a non-transitory computer-readable storage medium) storing instructions for executing the method.

It should be understood that the particular order in which the operations in FIGS. 9A-9G has been described is merely an example and is not intended to indicate that the described order is the only order in which the operations could be performed. One of ordinary skill in the art would recognize various ways to reorder the operations described herein.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 102) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 102 include one or more storage devices remotely located from the CPU(s) 104. The memory 102, or alternatively the non-volatile memory device(s) within this memory, comprises a non-transitory computer readable storage medium.

Communication systems as referred to herein (e.g., the I/O system 108) optionally communicate via wired and/or wireless communication connections. Communication systems optionally communicate with networks (e.g., the network 170), such as the internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 702.11a, IEEE 702.11ac, IEEE 702.11ax, IEEE 702.11b, IEEE 702.11g and/or IEEE 702.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A computer-implemented method, comprising:
at a server system including one or more processors and memory storing one or more programs for execution by the one or more processors:
receiving image data, the image data including an image of a document, wherein the image of the document includes facial image data;
determining a portion of the received image data that corresponds to a predefined document field;
determining a position for the image of the document, by identifying one or more facial features within the facial image data;
utilizing a neural network system to assign a label to the determined portion of the received image data;
performing text recognition on the portion of the received image data; and
storing recognized text in association with the assigned label.

2. The method of claim 1, further comprising:
after receiving the image data, determining a document type corresponding to the image of the document, the document type including document characteristics for the document type.

3. The method of claim 2, further comprising:
comparing the portion of the received image data with the document type to determine respective document characteristics for the portion of the received image data.

4. The method of claim 3, further comprising:
generating, based on the respective document characteristics for the portion of the received image data, sanitized document information, wherein the sanitized document information stores the document characteristics corresponding to the document type with a predetermined format.

5. The method of claim 2, wherein the document characteristics corresponding to the document type include a predetermined layout for the document type, wherein the predetermined layout includes a landscape layout or a portrait layout.

6. The method of claim 2, wherein the document characteristics corresponding to the document type include at least one or more selected from the group consisting of: one or more anchors, date format, or text format.

7. The method of claim 1, wherein the predefined document field corresponds to at least one of a name, a location, a date, a document type, or a document number.

8. A computer-implemented method, further comprising:
at a server system including one or more processors and memory storing one or more programs for execution by the one or more processors:
receiving image data, the image data including an image of a document;
determining a portion of the received image data that corresponds to a predefined document field;
utilizing a neural network system to assign a label to the determined portion of the received image data;
performing text recognition on the portion of the received image data;
storing recognized text in association with the assigned label;
before performing the text recognition on the portion of the received image data, determining a position of the image of the document, wherein the image of the document includes facial image data;
determining whether the position of the image of the document meets orientation criteria;
in accordance with a determination that the position of the document meets the orientation criteria, performing the text recognition on the portion of the received image data; and
determining the position for the image of the document, including:
determining one or more facial features corresponding to the facial image data; and
determining the position of the image of the document of the image data based on the one or more facial features.

9. The method of claim 8, wherein determining the position of the image of the document includes:
identifying respective corners of the image of the document; and
comparing the respective corners of the image of the document with document characteristics corresponding to a document type to determine the position of the document.

10. The method of claim 8, wherein:
   determining a saliency value for the predefined document field;
   determining whether the saliency value for the predefined document field meets a predetermined saliency threshold; and
   upon a determination that the saliency value does not meet the predetermined saliency threshold, requesting new image data that includes an image of the document.

11. The method of claim 8, wherein:
   the predefined document field includes text; and
   determining the position for the image of the document includes:
   determining, based on the predefined document field, a text position; and
   determining the position of the image of the document based on the text position.

12. The method of claim 8, wherein determining the position of the image of the document includes cropping the image of the document in the image data.

13. The method of claim 8, further comprising:
   in accordance with a determination that the position of the image of the document does not meet the orientation criteria, adjusting the image of the document to satisfy the orientation criteria; and
   in accordance with a determination that the position corresponding to the adjusted image of the document meets the orientation criteria, performing the text recognition on the adjusted image of the document.

14. A computer-implemented method, further comprising:
   at a server system including one or more processors and memory storing one or more programs for execution by the one or more processors:
   receiving image data, the image data including an image of a document;
   determining a portion of the received image data that corresponds to a predefined document field;
   utilizing a neural network system to assign a label to the determined portion of the received image data;
   performing text recognition on the portion of the received image data;
   storing recognized text in association with the assigned label;
   determining a saliency value for the predefined document field;
   determining whether the saliency value for the predefined document field meets a predetermined saliency threshold; and
   in accordance with a determination that the saliency value does not meet the predetermined saliency threshold, requesting new image data that includes an image of the document.

15. The method of claim 14, further comprising:
   in accordance with a determination that the saliency value meets the predetermined saliency threshold, generating a bounding box for the predefined document field; and
   performing the text recognition on the generated bounding box.

16. The method of claim 15, wherein utilizing the neural network system to assign the label to the determined portion of the received image data includes:
   determining a label for the generated bounding box; and
   assigning the label to the generated bounding box.

17. The method of claim 16, wherein the neural network system includes at least one recurrent neural network (RNN), or a convolutional neural network (CNN).

18. The method of claim 17, wherein the neural network system includes a plurality of neural networks, the plurality of neural networks including both the RNN and the CNN.

19. The method of claim 17, wherein:
   the neural network system includes a plurality of neural networks, the plurality of neural networks including both the RNN and the CNN; and
   determining the label for the generated bounding box includes:
   determining, using a first neural network of the plurality of neural networks, a first label for the generated bounding box;
   determining, using a second neural network of the plurality of neural networks, a second label for the generated bounding box; and
   comparing the first label and the second label to determine whether the first label and the second label match; and
   in accordance with a determination that the first label and the second label match, assigning the first label or the second label to the generated bounding box.

20. The method of claim 19, further comprising in accordance with a determination that the first label and the second label do not match, assigning a respective label of the first label or the second label with a highest relevance score.

21. The method of claim 16, wherein the neural network system includes a registration system, the registration system including a first template, wherein the first template includes a first predetermined label, the first predetermined label associated with a first predetermined label location; and wherein:
   determining the label for the generated bounding box includes:
   determining whether the first predetermined label corresponds to the generated bounding box by superimposing the first template over the image of the document;
   comparing the first predetermined label location with the generated bounding box to determine a template value;
   determining whether the template value meets similarity threshold; and
   in accordance with a determination that the template value meets the similarity threshold, determining a relevant label based on the first predetermined label; and
   in accordance with a determination that the template value for the first template does not meet the similarity threshold, determining the label for the generated bounding box based on a second template.

22. The method of claim 21, wherein determining the template value includes determining respective distances between the first predetermined label location and one or more edges of the image of the document, the respective distances measured based on one or more pixels between the first predetermined label location and the one or more edges.

23. A non-transitory computer readable storage medium storing one or more programs, the one or more programs comprising instructions, which when executed, cause a device to:
   receive image data, the image data including an image of a document, wherein the image of the document includes facial image data;
   determine a portion of the received image data that corresponds to a predefined document field;
   determine a position for the image of the document, by identifying one or more facial features within the facial image data;
   utilize a neural network system to assign a label to the determined portion of the received image data;

perform text recognition on the portion of the received image data; and store recognized text in association with the assigned label.

24. A system, comprising:
one or more processors;
memory; and
one or more programs, wherein the one or more programs are stored in the memory and are configured for execution by the one or more processors, the one or more programs including instructions for:
receiving image data, the image data including an image of a document, wherein the image of the document includes facial image data;
determining a portion of the received image data that corresponds to a predefined document field;
determine a position for the image of the document, by identifying one or more facial features within the facial image data;
utilizing a neural network system to assign a label to the determined portion of the received image data;
performing text recognition on the portion of the received image data; and
storing recognized text in association with the assigned label.

* * * * *